US012724915B2

(12) United States Patent
Dupont et al.

(10) Patent No.: US 12,724,915 B2
(45) **Date of Patent: *Sep. 1, 2026**

(54) SEMANTIC SEARCH AND RETRIEVAL OVER ENCRYPTED VECTOR SPACE

(71) Applicant: Cyborg Inc., New York, NY (US)

(72) Inventors: Nicolas Thomas Mathieu Dupont, New York, NY (US); Alexandre Helle, Forest Hills, NY (US)

(73) Assignee: Cyborg Inc., New York, NY (US)

( * ) Notice: Subject to any disclaimer, the term of this patent is extended or adjusted under 35 U.S.C. 154(b) by 30 days.

This patent is subject to a terminal disclaimer.

(21) Appl. No.: 18/822,876

(22) Filed: Sep. 3, 2024

(65) Prior Publication Data

US 2025/0028853 A1 Jan. 23, 2025

Related U.S. Application Data

(63) Continuation of application No. 18/595,285, filed on Mar. 4, 2024, now Pat. No. 12,164,664.

(Continued)

(51) Int. Cl.
*G06F 21/62* (2013.01)
*G06F 16/22* (2019.01)

(Continued)

(52) U.S. Cl.
CPC ...... *G06F 21/6227* (2013.01); *G06F 16/2237* (2019.01); *H04L 9/0618* (2013.01); *H04L 9/0643* (2013.01); *H04L 9/3213* (2013.01)

(58) Field of Classification Search
CPC ............. G06F 21/6227; G06F 16/2237; H04L 9/0618; H04L 9/0643; H04L 9/3213; G06N 3/08; G06N 3/045
See application file for complete search history.

(56) References Cited

U.S. PATENT DOCUMENTS 4,812,627 A * 3/1989 Wexler ................. G06Q 40/125 705/32
9,996,764 B2 * 6/2018 Cheng ................. G06F 16/5866

(Continued)

FOREIGN PATENT DOCUMENTS

KR 20170097908 A 8/2017
KR 102102307 B1 4/2020

OTHER PUBLICATIONS

Goh, E-J., "Secure Indexes," JACR Cryptology ePrint Archive, Mar. 2004, 18 pages.

(Continued)

*Primary Examiner* — J. Brant Murphy
(74) *Attorney, Agent, or Firm* — COOLEY LLP

(57) ABSTRACT

A method and system for performing end-to-end encrypted semantic search and retrieval are disclosed. The system is configured to perform semantic searches of encrypted data, using product quantization and distance scores to facilitate efficient and secure retrieval of relevant data. User queries, indexes, document identifiers and document contents remain encrypted throughout the search process, offering a significant enhancement in privacy and security compared to known search methods. The method and system are particularly beneficial for applications that rely on semantic understanding in search queries, such as Generative AI and Retrieval-Augmented Generation (RAG), while maintaining strict data confidentiality.

24 Claims, 19 Drawing Sheets

Related U.S. Application Data

(60) Provisional application No. 63/620,097, filed on Jan. 11, 2024, provisional application No. 63/488,151, filed on Mar. 2, 2023.

(51) Int. Cl.
*H04L 9/06* (2006.01)
*H04L 9/32* (2006.01)

(56) References Cited

U.S. PATENT DOCUMENTS

| | | | | |
|---|---|---|---|---|
| 10,042,935 | B1* | 8/2018 | Perkins | G06F 16/9538 |
| 10,057,224 | B2* | 8/2018 | Oxford | H04L 63/045 |
| 10,270,788 | B2* | 4/2019 | Faigon | G06N 20/00 |
| 11,423,028 | B2 | 8/2022 | Dupont et al. | |
| 11,860,875 | B2 | 1/2024 | Dupont et al. | |
| 2007/0139227 | A1* | 6/2007 | Speirs, II | H03M 7/30 341/50 |
| 2009/0043741 | A1* | 2/2009 | Kim | G06F 16/3322 |
| 2013/0303274 | A1* | 11/2013 | Gadher | G07F 17/3209 463/29 |
| 2015/0186471 | A1* | 7/2015 | Yammahi | G06F 16/2468 707/780 |
| 2016/0210326 | A1* | 7/2016 | Tolman | G06F 16/2423 |
| 2016/0283600 | A1* | 9/2016 | Ackerly | H04L 63/04 |
| 2016/0292201 | A1* | 10/2016 | Asaad | G06F 16/2365 |
| 2017/0220696 | A1* | 8/2017 | Zhang | G06F 16/9017 |
| 2018/0095720 | A1* | 4/2018 | Gopal | G06F 16/2255 |
| 2019/0095490 | A1* | 3/2019 | Colgrove | G06F 16/2255 |
| 2019/0179858 | A1* | 6/2019 | Douze | G06F 16/2365 |
| 2019/0251189 | A1* | 8/2019 | VanderSpek | G06F 16/1756 |
| 2019/0325083 | A1* | 10/2019 | Payer | G06F 16/90344 |
| 2020/0159779 | A1* | 5/2020 | Dong | H04L 9/0631 |
| 2020/0175390 | A1 | 6/2020 | Conti et al. | |
| 2021/0350026 | A1* | 11/2021 | Doyle | G06F 21/64 |
| 2022/0058198 | A1* | 2/2022 | Dupont | G06F 21/602 |
| 2022/0075843 | A1* | 3/2022 | Kumar | G06N 3/08 |
| 2022/0092382 | A1* | 3/2022 | Moshovos | G06N 3/04 |
| 2022/0391397 | A1 | 12/2022 | Dupont et al. | |
| 2022/0391947 | A1* | 12/2022 | Kleber | G06F 16/951 |
| 2023/0334035 | A1* | 10/2023 | Wang | G06F 17/40 |
| 2023/0409870 | A1* | 12/2023 | Tavella | G06N 3/08 |
| 2024/0054102 | A1* | 2/2024 | Pavetic | G06F 3/0685 |
| 2024/0160849 | A1* | 5/2024 | Fanelli | G10L 25/84 |

OTHER PUBLICATIONS

International Preliminary Report on Patentability in PCT/US2021/047105, mailed Feb. 16, 2023, 5 pages.

International Search Report and Written Opinion for International Application No. PCT/US2021/047105, mailed Dec. 1, 2021, 9 pages.

International Search Report and Written Opinion for PCT Application No. PCT/US2024/018427, mailed Jul. 2, 2024, 16 pages.

Kamara, S., "Encrypted Search," XRDS: Crossroads, The ACM Magazine for Students, Mar. 27, 2015, vol. 21, No. 3, pp. 30-34.

* cited by examiner

INDEXING

202 Document input

204 Stemming Stop word removal

206 Frequencies Unique keyword storage

222 Account Creation

230 Keystore generation

Private HMAC 256b KEY 1

Private HMAC 256b KEY 2

Private AES256 Key

224 Keyword Map creation

226 AES256 (updatedMap)

Encrypted Map

228 Server

Figure 6:
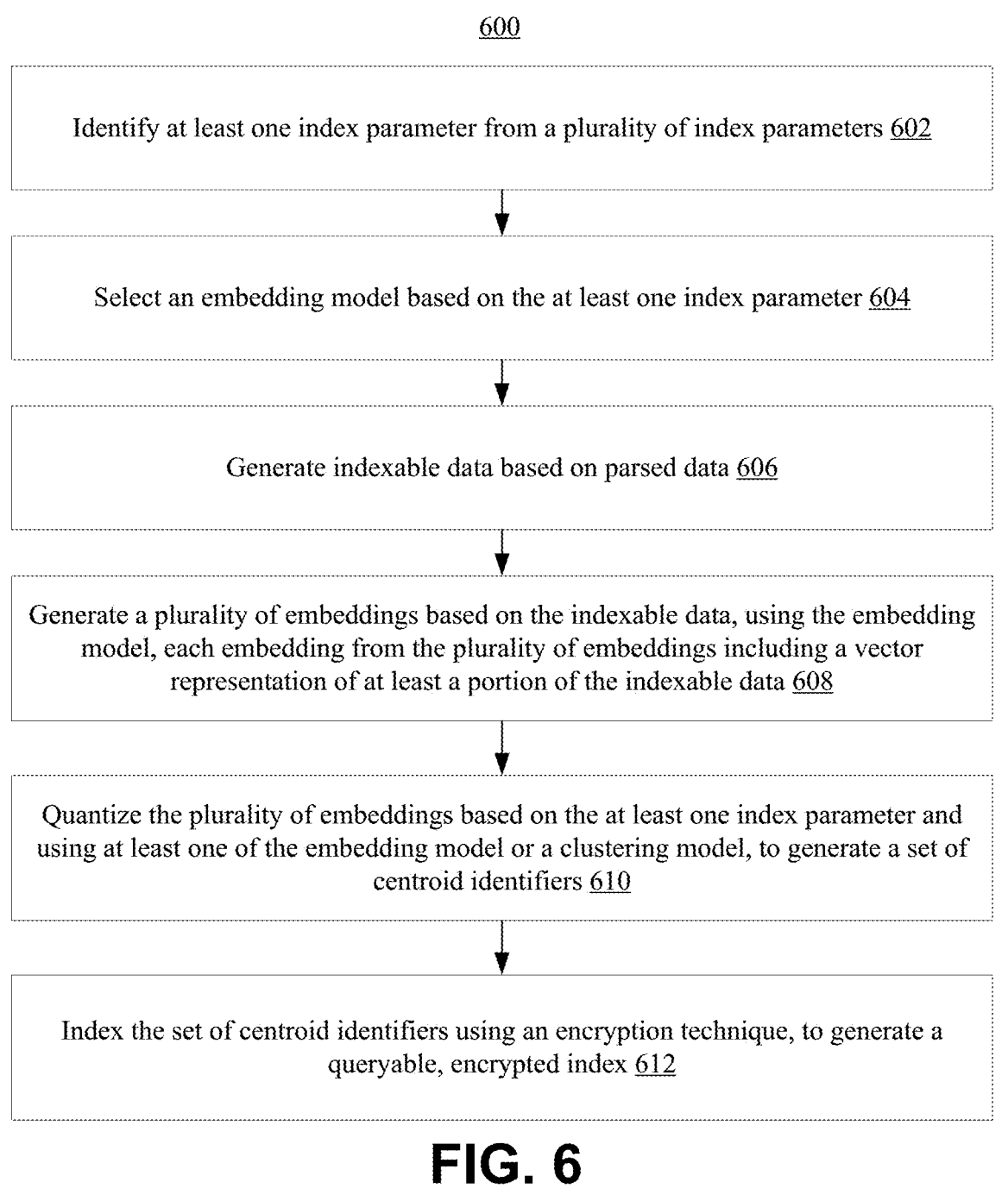

600

Identify at least one index parameter from a plurality of index parameters 602

Select an embedding model based on the at least one index parameter 604

Generate indexable data based on parsed data 606

Generate a plurality of embeddings based on the indexable data, using the embedding model, each embedding from the plurality of embeddings including a vector representation of at least a portion of the indexable data 608

Quantize the plurality of embeddings based on the at least one index parameter and using at least one of the embedding model or a clustering model, to generate a set of centroid identifiers 610

Index the set of centroid identifiers using an encryption technique, to generate a queryable, encrypted index 612

Figure 7:
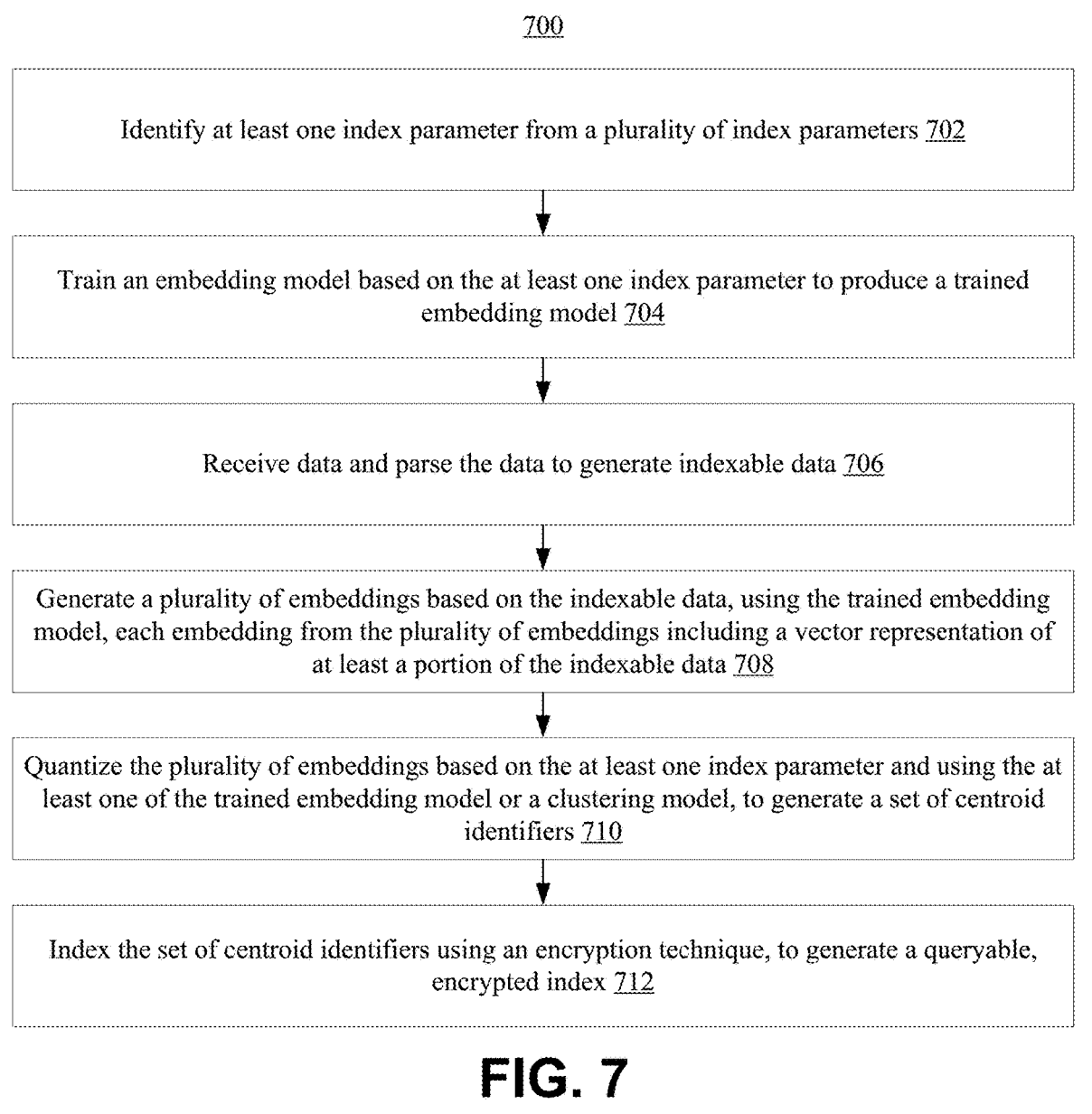

Identify at least one index parameter from a plurality of index parameters 702

Train an embedding model based on the at least one index parameter to produce a trained embedding model 704

Receive data and parse the data to generate indexable data 706

Generate a plurality of embeddings based on the indexable data, using the trained embedding model, each embedding from the plurality of embeddings including a vector representation of at least a portion of the indexable data 708

Quantize the plurality of embeddings based on the at least one index parameter and using the at least one of the trained embedding model or a clustering model, to generate a set of centroid identifiers 710

Index the set of centroid identifiers using an encryption technique, to generate a queryable, encrypted index 712

Figure 8:
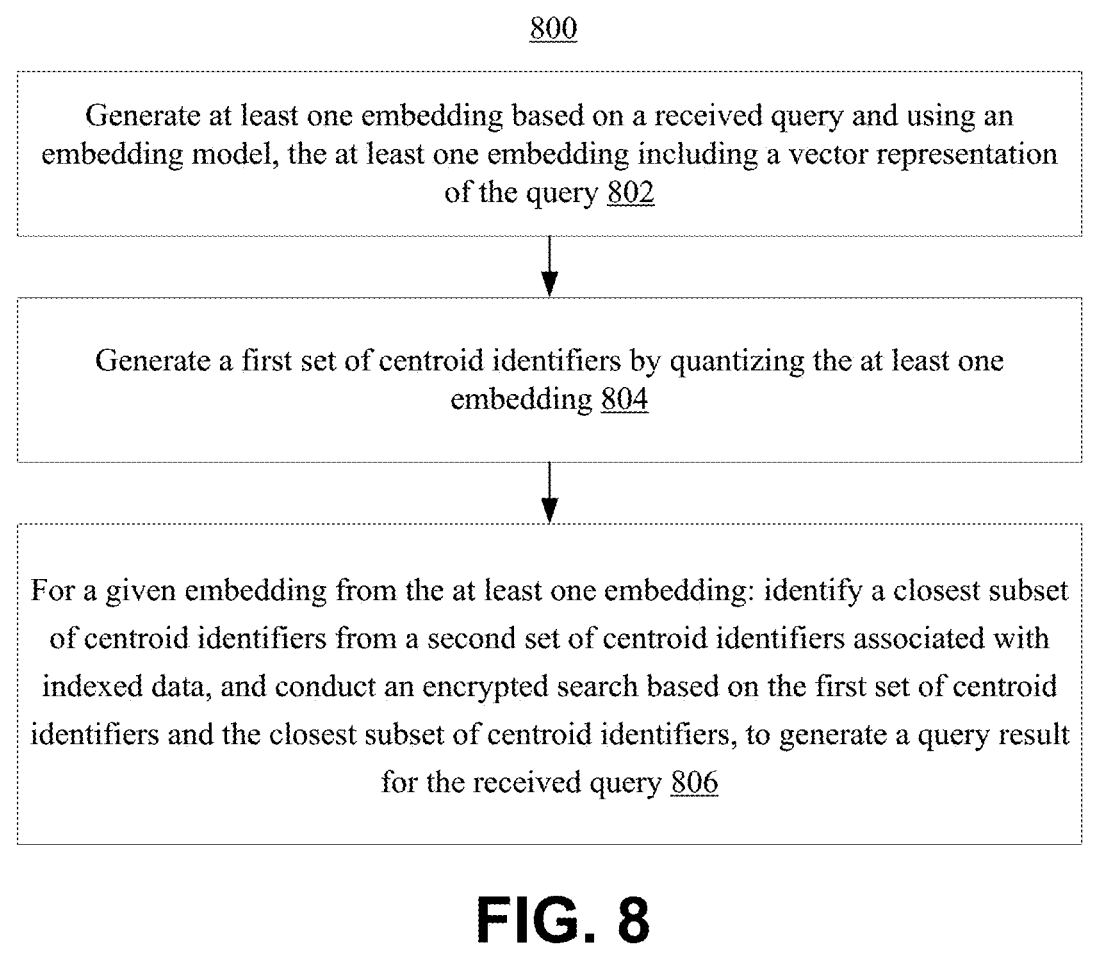

Generate at least one embedding based on a received query and using an embedding model, the at least one embedding including a vector representation of the query 802

↓

Generate a first set of centroid identifiers by quantizing the at least one embedding 804

↓

For a given embedding from the at least one embedding: identify a closest subset of centroid identifiers from a second set of centroid identifiers associated with indexed data, and conduct an encrypted search based on the first set of centroid identifiers and the closest subset of centroid identifiers, to generate a query result for the received query 806

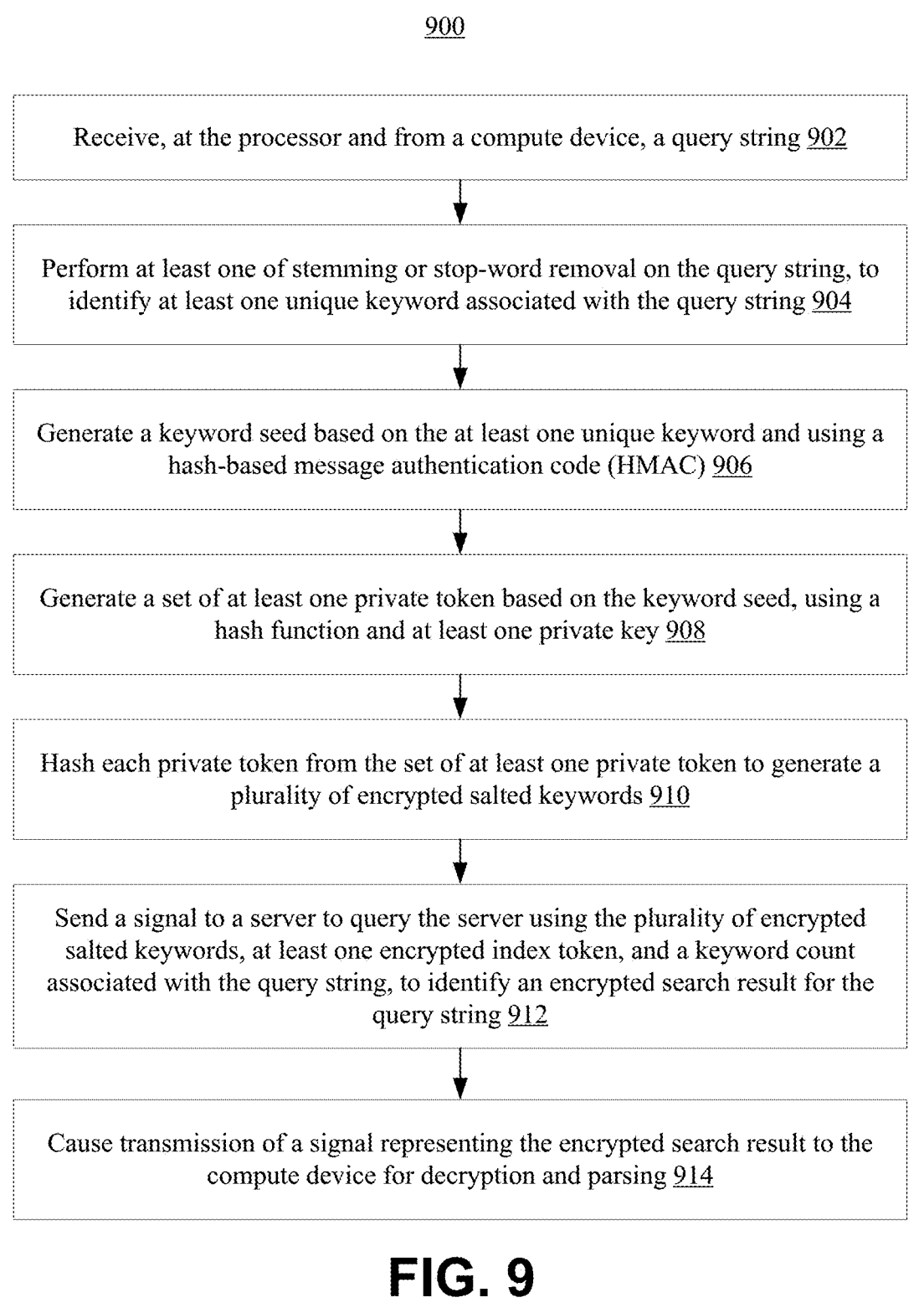

Receive, at the processor and from a compute device, a query string 902

Perform at least one of stemming or stop-word removal on the query string, to identify at least one unique keyword associated with the query string 904

Generate a keyword seed based on the at least one unique keyword and using a hash-based message authentication code (HMAC) 906

Generate a set of at least one private token based on the keyword seed, using a hash function and at least one private key 908

Hash each private token from the set of at least one private token to generate a plurality of encrypted salted keywords 910

Send a signal to a server to query the server using the plurality of encrypted salted keywords, at least one encrypted index token, and a keyword count associated with the query string, to identify an encrypted search result for the query string 912

Cause transmission of a signal representing the encrypted search result to the compute device for decryption and parsing 914

FIG. 9

SEMANTIC SEARCH AND RETRIEVAL OVER ENCRYPTED VECTOR SPACE

CROSS REFERENCE TO RELATED APPLICATIONS

This application is a continuation of U.S. patent application Ser. No. 18/595,285, filed Mar. 4, 2024 and titled "SEMANTIC SEARCH AND RETRIEVAL OVER ENCRYPTED VECTOR SPACE," which claims priority to and the benefit of U.S. Provisional Patent Application No. 63/488,151, filed Mar. 2, 2023 and titled "METHOD AND SYSTEM FOR SECURE SEARCH OVER ENCRYPTED DATA," and which also claims priority to and the benefit of U.S. Provisional Patent Application No. 63/620,097, filed Jan. 11, 2024 and titled "SEMANTIC SEARCH & RETRIEVAL OVER ENCRYPTED VECTOR SPACE," the entire contents of each of which are incorporated by reference herein in their entireties.

FIELD

The present disclosure relates to systems and methods for searching encrypted data, and more specifically, to semantic indexing, search and retrieval of data within an encrypted vector space, according to some embodiments. Some embodiments provide secure, efficient and accurate search systems capable of operating within data-sensitive environments, such as confidential artificial intelligence (AI), healthcare, legal, and financial services.

BACKGROUND

Encryption can include converting plaintext or any other type of data into a coded message that can only be read by authorized parties who possess the key to decipher that coded message. Encryption can ensure confidentiality and integrity of the data being transmitted or stored, by making the encrypted data unreadable to anyone who does not have access to the key. Encryption can be used in many areas, including communication, finance, and data storage, to protect sensitive information from unauthorized access, theft, or modification.

In the realm of Generative Artificial Intelligence (AI) and other data-intensive applications, known search systems use decryption of data prior to search, posing significant risks to user privacy and data confidentiality. Moreover, known systems employ indexing and retrieval methods that lack the flexibility and security desired for handling sensitive data in an encrypted form. Accordingly, there is a growing need for innovative solutions that can offer robust semantic search capabilities without compromising data security or operational efficiency.

SUMMARY

In some embodiments, a non-transitory, processor-readable medium stores instructions to cause a processor to identify at least one index parameter from a plurality of index parameters, and to select an embedding model based on the at least one index parameter. The non-transitory, processor-readable medium also stores instructions to generate indexable data based on parsed data, and to generate a plurality of embeddings based on the indexable data, using the embedding model. Each embedding from the plurality of embeddings includes a vector representation of at least a portion of the indexable data. The non-transitory, processor-readable medium also stores instructions to quantize the plurality of embeddings based on the at least one index parameter and using at least one of the embedding model or a clustering model, to generate a set of centroid identifiers, and to index the set of centroid identifiers using an encryption technique, to generate a queryable, encrypted index.

In some embodiments, a method includes identifying, via a processor, at least one index parameter from a plurality of index parameters, and training, via the processor, an embedding model based on the at least one index parameter, to produce a trained embedding model. The method also includes receiving data at the processor, and parsing the data via the processor to generate indexable data. The method also includes generating, via the processor, a plurality of embeddings based on the indexable data, using the trained embedding model. Each embedding from the plurality of embeddings includes a vector representation of at least a portion of the indexable data. The method also includes quantizing the plurality of embeddings, via the processor, based on the at least one index parameter and using the at least one of the trained embedding model or a clustering model, to generate a set of centroid identifiers. The method also includes indexing, via the processor, the set of centroid identifiers using an encryption technique, to generate a queryable, encrypted index.

In some embodiments, a system includes a processor and a memory, the memory being operably coupled to the processor and storing instructions that, when executed by the processor, cause the processor to generate at least one embedding based on a received query and using an embedding model. The at least one embedding can include a vector representation of the query. The memory also stores instructions to cause the processor to generate a first set of centroid identifiers by quantizing the at least one embedding, and for a given embedding from the at least one embedding: (1) identify a closest subset of centroid identifiers from a second set of centroid identifiers associated with indexed data, and (2) conduct an encrypted search based on the first set of centroid identifiers and the closest subset of centroid identifiers, to generate a query result for the received query.

In some embodiments, a non-transitory, processor-readable medium stores instructions to cause a processor to receive, at the processor and from a compute device, a query string, and to perform at least one of stemming or stop-word removal on the query string, to identify at least one unique keyword associated with the query string. The non-transitory, processor-readable medium also stores instructions to cause the processor to generate a keyword seed based on the at least one unique keyword and using a hash-based message authentication code (HMAC), and to generate a set of at least one private token based on the keyword seed, using a hash function and at least one private key. The non-transitory, processor-readable medium also stores instructions to cause the processor to hash each private token from the set of at least one private token to generate a plurality of encrypted salted keywords. The non-transitory, processor-readable medium also stores instructions to cause the processor to send a signal to a server to query the server using the plurality of encrypted salted keywords, at least one encrypted index token, and a keyword count associated with the query string, to identify an encrypted search result for the query string. The non-transitory, processor-readable medium also stores instructions to cause the processor to cause transmission of a signal representing the encrypted search result to the compute device for decryption and parsing.

In one or more embodiments, at least one index parameter is identified from a plurality of index parameters. An embedding model is selected based on the at least one index parameter. Indexable data is generated based on parsed data. A plurality of embeddings are generated based on the indexable data and using the embedding model. Each embedding from the plurality of embeddings includes a vector representation of at least a portion of the indexable data. The plurality of embeddings are quantized based on the at least one index parameter and at least one of the embedding model or a clustering model is used to generate a set of centroid identifiers. The set of centroid identifiers are indexed using an encryption technique to generate a queryable, encrypted index.

In one or more embodiments, at least one index parameter is identified from a plurality of index parameters. An embedding model is trained based on the at least one index parameter to produce a trained embedding model. Data is received and the data is parsed to generated indexable data. A plurality of embeddings are generated based on the indexable data and using the trained embedding model. Each embedding from the plurality of embeddings includes a vector representation of at least a portion of the indexable data. The plurality of embeddings is quantized based on the at least one index parameter and using the at least one of the trained embedding model or a clustering model to generate a set of centroid identifiers. The set of centroid identifiers are indexed using an encryption technique to generate a queryable, encrypted index.

In one or more embodiments, at least one embedding is generated based on a received query and using an embedding model. The at least one embedding includes a vector representation of the query. A first set of centroid identifiers are identified by quantizing the at least one embedding. For a given embedding from the at least one embedding: a closest subset of centroid identifiers is identified from a second set of centroid identifiers associated with indexed data; and an encrypted search is conducted based on the first set of centroid identifiers and the closest subset of centroid identifiers to generate a query result for the received query.

In one or more embodiments, a query string is received from a compute device. At least one of stemming or stopword removal is performed on the query string to identify at least one unique keyword associated with the query string. A keyword seed is generated based on the at least one unique keyword and using a hash-based message authentication code (HMAC). A set of at least one private token is generated based on the keyword seed using a hash function and at least one private key. Each private token from the set of at least one private token is hashed to generate a plurality of encrypted salted keywords. A signal is sent to a server to query the server using the plurality of encrypted salted keywords, at least one encrypted index token, and a keyword count associated with the query string to identify an encrypted search result for the query string. A signal representing the encrypted search result is caused to be transmitted to the compute device for decryption and parsing.

Example features, structure and operation of various embodiments are described in detail below with reference to the accompanying drawings.

BRIEF DESCRIPTION OF THE DRAWINGS

FIG. 6 shows a flowchart of a method to generate a queryable encrypted index, according to an embodiment.

FIG. 7 shows a flowchart of a method to train and use an embedding model, according to an embodiment.

FIG. 8 shows a flowchart of a method to perform an encrypted search, according to an embodiment.

FIG. 9 shows a flowchart of a method to perform an encrypted search, according to an embodiment.

DETAILED DESCRIPTION

Figure 1:
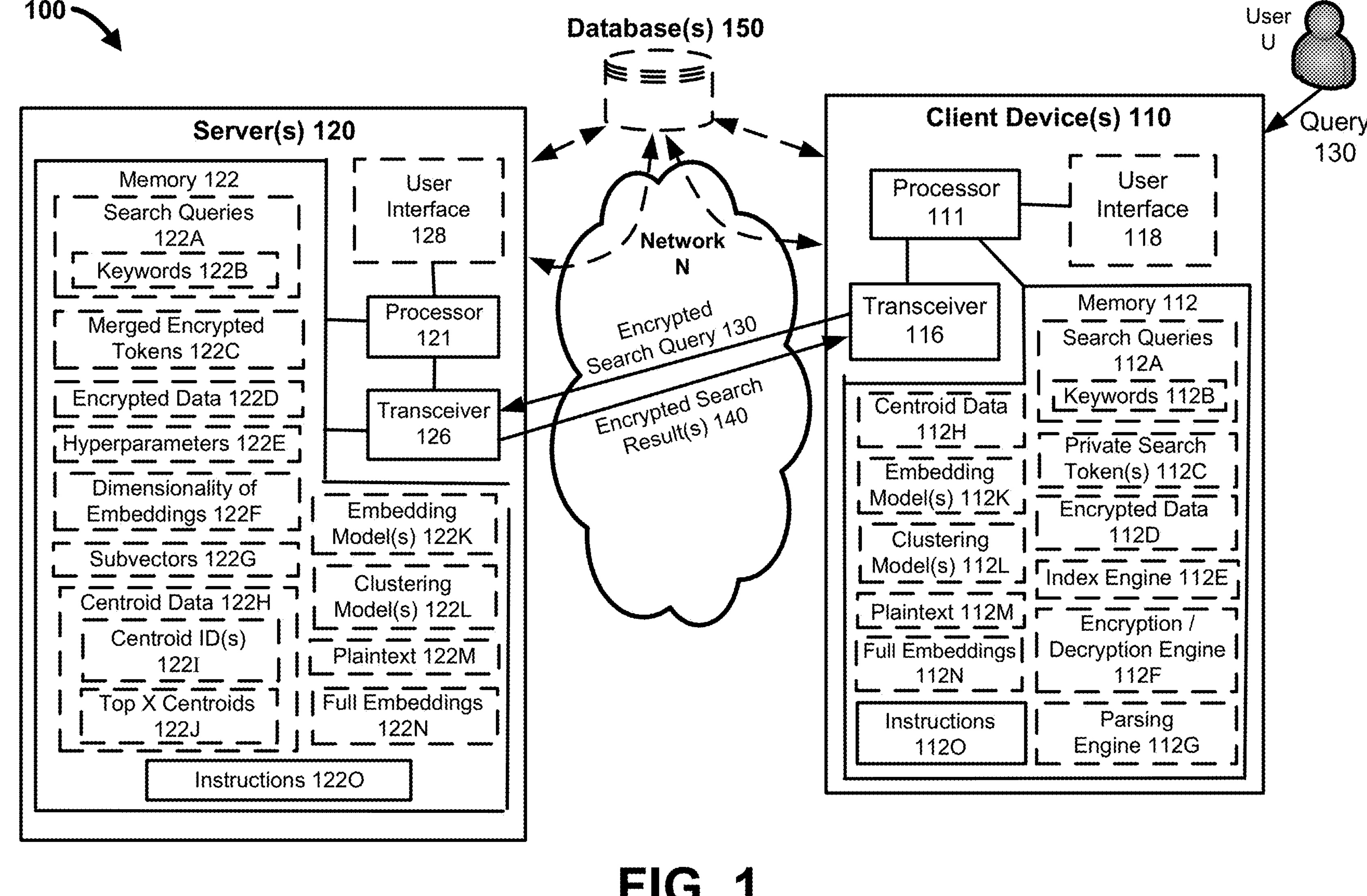
FIG. 1 is a system block diagram of a system for performing end-to-end encrypted semantic searches/performing searches of encrypted data, according to one or more embodiments.

In the age of Generative AI, semantic search is an increasingly important tool for augmenting model knowledge. AI applications such as Retrieval-Augmented Generation ("RAG") leverage semantic search and retrieval processes to provide or "feed" an AI model (e.g., a large language model ("LLM")) with context (e.g., data) for a specific query, thereby allowing/equipping the AI model to answer questions referencing data that is/was not present in the training data of that AI model. Such applications, however, and Generative AI as a whole, pose a number of emerging threats to data security and privacy. For example, the propensity of language models to inadvertently leak private information increases the desire for a secure approach to handling sensitive data, which known AI tools do not adequately address. As another example, keeping data encrypted can be desirable in some cases, e.g., to maintain confidentiality of the data, however known techniques do not adequately analyze the encrypted data for semantic similarity and instead, for example, decrypt the data and consequently jeopardize confidentiality.

To address the foregoing challenges, one or more embodiments of the present disclosure include a system(s) and/or method(s) for conducting encrypted semantic searches, optionally based in part on one or more methods set forth in U.S. Pat. No. 11,423,028, titled "System and Method for Encrypted Search Using Hash Vectorization Models," issued on Aug. 23, 2022, the contents of which are incorporated by reference herein in their entirety for all purposes. As used herein, a "semantic search" refers to a search for "similar data" relative to a search query or prompt, based on an intent, a context, and/or a meaning (e.g., a contextual meaning) of the search query. Semantic search can be contrasted with lexical search, in which indexed documents only "match" if they contain the exact keyword provided in a search query. One or more embodiments set forth herein introduce advanced capabilities for semantic understanding within an encrypted framework, using one or more "forward privacy" techniques, e.g., in which one or more private search tokens are generated for each input token (optionally including one or more keywords), using one or more private keys, and which can ensure that the private search tokens remain encrypted throughout the encrypted semantic search process, so that the keyword(s) cannot be identified or traced back to an original document. Such capabilities can be desirable for applications in which data sensitivity and privacy are prioritized, and address the limitations of known encrypted search systems through the enablement of nuanced semantic search capabilities. In some implementations, a cryptographic layer of privacy can be added to Generative AI applications that leverage semantic search (e.g., RAG). Semantic search and retrieval methods set forth herein, in some embodiments, use one or more hash vectorization modeling techniques and/or forward-privacy technologies, in combination with a product-quantization method, to facilitate the secure indexing and retrieval of private vector embeddings in an encrypted vector space. The indexed vector embeddings (which can be quantized as discussed herein) constitute indexed meanings associated with a semantic search.

Some implementations are related to a system and method for performing a search of encrypted data. In some embodiments, an encrypted data search includes indexing a user's encrypted data by generating private search tokens, encrypting the user's search query, transmitting the encrypted search query to the server, and decrypting and parsing the results from the search server.

Some implementations are related to conducting semantic search and retrieval over encrypted vector spaces, and enhancing data security while maintaining high search accuracy and efficiency. In some embodiments, techniques described herein include the selection of one or more index/indexing parameters (e.g., index hyperparameters); the selection of the one or more index/indexing parameters can include the vector embedding model used, quantization parameters, and index modes. Some implementations support a number of index modes to support varied use cases, which include, for example, Inverted File (IVF), Product-Quantized Inverted File (PQIVF), and IVF with Product Quantization (IVFPQ).

Some implementations are related to selecting and/or training, based on the one or more hyperparameters, (1) an embedding model and (2) at least one clustering model (e.g., one clustering model or multiple clustering models). Some implementations further include receiving/ingesting data (or fragments/derivatives thereof) and parsing the data (or fragments/derivatives thereof) to generate indexable data (such as plaintext or preprocessed media). The embedding model can configured to generate embeddings based on the indexable data. These embeddings, representing vector representations of indexed data and/or queries, can then be processed according to a predetermined (e.g., based on user input) indexing mode. For IVF, embeddings can be quantized in their entirety without subvector partitioning, in a process referred to as "coarse" quantization, which generates a single centroid identifier per embedding. For PQIVF, embeddings can be partitioned into a set of subvectors, with each quantized by subvector-specific clustering model to generate subvector-centroid identifiers. IVFPQ can extend this by merging the coarse quantization of IVF with the Product Quantization of PQIVF, producing both coarse and subvector-centroid identifiers. Each of these indexing modes exhibit tradeoffs across retrieval accuracy, performance and memory/storage overhead. For example, the IVF index mode, due to its relative simplicity, can exhibit the higher levels of performance and lower memory footprint, at the cost of retrieval accuracy (e.g., compared to PQIVF and/or IVFPQ). PQIVF and IVFPQ, on the other hand, can provide a more balanced tradeoff between performance, memory footprint, and retrieval accuracy.

Some implementations are related to indexing the centroid identifiers from the plurality of centroid identifiers using encrypted indexing, to generate a plurality of encrypted indexed centroid identifiers. These encrypted indexed centroid indexes can be stored in an index location (such as, but not limited to, in-memory, on-disk, or a database/key-value store), and can be leveraged to generate a query response in response to an encrypted query.

Moreover, some implementations can leverage TEEs, such as those on Central Processing Units (CPUs) and Graphics Processing Units (GPUs), which extends the data security and privacy guarantees of TEEs, particularly when used in conjunction with data-intensive applications like Confidential AI.

In some implementations, an "embedding" refers to a relatively low-dimensional space into which high-dimensional vectors can be translated. For example, an embedding can capture some of the semantics of the input by placing semantically similar inputs close together in the embedding space.

In some implementations, a "hyperparameter" refers to a machine learning parameter whose value is chosen before a learning algorithm is trained and/or which specifies details of the learning algorithm.

In some implementations, a "centroid" refers to the center of a cluster defined by a clustering algorithm, such as K-Means. Each centroid in a clustering model can be labeled, allowing the label to be used to quantize a value into that centroid, such as with embedding quantization.

In some implementations, "recall" and "precision" refer to measures of search performance. In some implementations, "recall" is the number of relevant documents retrieved divided by the total number of relevant documents in existence. In some implementations, "precision" is the number of relevant documents retrieved divided by the total number of documents retrieved. In some implementations, both of these metrics range from, for example, 0 to 1, with a higher value considered better.

System Overview

According to one or more embodiments, a system is configured to facilitate encrypted semantic search. The system can include, for example, a client device for query processing and a server for handling encrypted data storage and retrieval. The system can be structured to encompass/facilitate several different phases including (A) index mode selection, (B) hyperparameter selection, (C) index model training, (D) encrypted semantic indexing, and (E) encrypted semantic retrieval. Each of these is discussed further, in turn, below.

(A) Index Mode Selection

In one or more embodiments, at least three distinct index modes tailored for encrypted semantic search are supported: Inverted File (IVF), Product-Quantized Inverted File (PQIVF), and Inverted File with Product Quantization (IVFPQ). Each mode is designed to cater to specific performance, accuracy and storage requirements, and with respective hyperparameters, allow for tailored application across various domains and use cases. IVF, PQIVF, and/or IVFPQ can be performed using embeddings. The embeddings can be generated by receiving/ingesting data (or fragments/derivatives thereof), parsing the data (or fragments/derivatives thereof) to generate indexable data (such as plaintext or preprocessed media), and generating the embeddings using an embedding model and based on (e.g., by inputting to the embedding model) the indexable data. These embeddings can represent vector representations of indexed data and/or queries, can then be processed according to a predetermined (e.g., based on user input) indexing mode (e.g., IVF, PQIVF, IVFPQ).

Inverted File (IVF)

The IVF mode focuses on rapid retrieval speeds with a simplified quantization process. Using IVF, embeddings (e.g., high-dimensionality embeddings) are quantized as a whole, without being partitioned into subvectors, using a trained clustering algorithm such as k-means. This "coarse" quantization process results in a single centroid identifier for each embedding, reducing the computational complexity and storage requirements.

Retrieval using an IVF index includes using the same coarse quantization process on the query embedding, and performing an encrypted search for the centroid identifier produced. There are a number of optimizations which significantly improve retrieval accuracy, such as centroid oversampling, and is discussed herein.

Product-Quantized Inverted File (PQIVF)

The PQIVF mode enhances search granularity by partitioning each vector embedding into multiple subvectors prior to quantization. This partitioning allows for a more detailed representation of the embedding space (e.g., compared to not partitioning into subvectors), as each subvector is quantized independently, generating a set of subvector-centroid identifiers. This "fine quantization" process can be achieved using a set of clustering algorithms trained on each subvector. PQIVF strikes a balance between retrieval accuracy and performance, providing more nuanced search results without significantly impacting search speed. The set of clustering algorithms, which can use a clustering mechanism such as K-Means, can be trained to position the clusters appropriately for the dataset. Additional details related to this training phase is discussed in section "(c) Index Model Training" below, and can use the same embeddings which are to be indexed, or others which are representative of the embeddings that will be indexed (such as a sample).

Retrieval for PQVIF indexes is similar to IVF, with the exception of using fine quantization instead of coarse quantization on the query embeddings. Similar optimizations for recall are available to PQIVF as well. In some implementations, the optimizations described herein include not only searching for the closest centroid for a given subvector/embedding, but rather the N closest centroids, and computing the distance between these centroids and the query embedding in order to boost recall (this is also described in section "(e) Encrypted Semantic Retrieval."

In some implementations, the underlying clustering mechanism (e.g., K-Means) can be the same for fine quantization and coarse quantization; in coarse quantization, however, the entire embedding is clustered into a single centroid, whereas in fine quantization the embedding is split into M subvectors (M being at least two), each of which is clustered into a centroid (meaning that the entire embedding is clustered into M centroids). So, in this example, the set of clustering algorithms used for fine quantization could include M clustering algorithms (each clustering algorithm from the M clustering algorithms used for a subvector from the M subvectors).

Inverted File with Product Quantization (IVFPQ)

The IVFPQ mode provides an indexing option, combining the coarse quantization approach of IVF with the fine subvector quantization of PQIVF. This hybrid method first applies coarse quantization to the entire embedding for encrypted indexing, followed by a fine quantization of the embedding subvectors for storage in the encrypted index. At retrieval time, the same retrieval process from IVF is used, but the fine-quantized embeddings are returned for finer distance computation. This dual-layer quantization approach allows IVFPQ to offer a higher level of search accuracy (recall and precision) among the three modes, making it desirable for applications where accuracy is paramount.

(B) Hyperparameter Selection

In one or more embodiments, a hyperparameter selection phase includes selecting, or receiving representations of, one or more hyperparameters that govern an operation, across all/multiple (e.g., some) stages, of a system of the present disclosure. The effectiveness and efficacy of the encrypted semantic search system are influenced by these hyperparameters. By way of example, the one or more hyperparameters can include a dimensionality of full embeddings, a number of subvectors (e.g., for PQIVF and IVFPQ but not IVF), the number of centroids, and/or additional quantization parameters. The selection of these hyperparameters can be performed with an objective of achieving a desired degree of optimization of a performance of the system and/or an accuracy of a search capability of the system. In some implementations, the selection of the one or more hyperparameters is performed by a user (e.g., an end user or developer, the latter for example when incorporating the functionality described herein into a software application or "app"), based on a desired behavior of the system and representations of the user-selected one or more hyperparameters can be stored in a memory of a client compute device and/or server.

(C) Index Model Training

In one or more embodiments, an index model training phase includes a preparation of one or more models for embedding generation and clustering. The index model training phase ensures that these models, and the index at large, are better (e.g., optimally) prepared to handle the specific characteristics of the data they will encounter (e.g., receive as input). The training phase can include selection, training and/or fine-tuning of models based on the previously selected hyperparameters, laying the groundwork for accurate and efficient indexing and retrieval operations.

The one or more models for embedding generation and clustering can include an embedding model. The embedding model transforms raw data (e.g., text, image or audio) into vector representations that are used in some and/or all subsequent indexing and search operations. The system can be designed to support any type of embedding model, including those based on Convolutional Neural Networks (CNNs) for images and Recurrent Neural Networks (RNNs) or Transformers for textual data. Such models can be fine-tuned or even trained from scratch for specific use cases. Examples of embedding models that can be used include Word2Vec, GloVe, FastText, SIMCSE, GTE, E5, and/or the like. In some implementations, the embedding model is chosen based on performance characteristics of the embedding model (e.g., retrieval benchmarks).

The one or more models for embedding generation and clustering can include a clustering model. A clustering model(s) can be used in the quantization processes (both coarse and fine) to group embeddings (e.g., generated by the embedding model) or their subvectors (e.g., generated based on the embeddings) into centroids, forming the basis for the system's indexing structure. In some implementations, a "centroid" refers to the center of a cluster. K-means can be employed in some implementations for its balance of simplicity and effectiveness, but the system can additionally or alternatively use other techniques in other implementations like Gaussian Mixture Models (GMMs) or hierarchical clustering (e.g., depending on the complexity of the data and/or the desired granularity of the indexing). Regardless of the type of clustering model(s) used, the clustering model(s) can be trained for the specific hyperparameter-data combination in use to provide improved and/or the highest performance semantic search. Said differently, the clustering model(s) can be trained to comply with the selected hyperparameters. For example, if one hyperparameter is the number of centroids, a cluster algorithm (e.g., K-Means) can be trained with a defined number of centroids (e.g., K) so this hyperparameter selection affects the cluster model(s)' training.

(D) Encrypted Semantic Indexing

Some implementations include encrypted semantic indexing. In some embodiments, encrypted semantic indexing includes data ingestion, quantization and indexing.

In one or more embodiments, as described above with reference to the embedding model producing embeddings, a data ingestion process includes parsing and embedding indexable data from input data or fragments. Alternatively or in addition, the data ingestion process can include parsing and embedding inputs other than text (e.g., to produce "multi-modal" embeddings that represent text, audio images, video, sensor data, biometrics, geospatial data, time series, graphs, 3D scans, and/or the like). As used herein, "fragments" can refer, by way of example (and, e.g., in the context of AI applications such as RAG), to equally-sized (or, in other implementations, unequally-sized) chunks (or data chunks) that are derived from a document and that may have some overlap with one another chunks. The use of fragments can facilitate the specific retrieval of the most relevant chunks of data at search time (i.e., in response to a query). In some implementations, "input data" can be divided/chunked to create "fragments." In some retrieval applications, such as RAG, the plaintext is chunked into fragments to fit the context (e.g., retrieved data) within the LLM's context length.

The resulting embeddings (e.g., full embeddings, or not-yet-quantized "high-dimensionality" embeddings) are then ready for quantization. Depending on the index mode selection, the embeddings may be split/partitioned into a plurality of subvectors (e.g., if index mode is PQIVF or IVFPQ), with each subvector from the plurality of subvectors quantized using one or more trained clustering models from the aforementioned step. Alternatively or additionally, the embeddings may be directly quantized using coarse quantization and without generated subvectors (e.g., if index mode is IVF). The quantization results in a series or set of centroid identifiers ("IDs"), as described above with reference to the clustering model(s) producing centroids. In some implementations, the system can also facilitate/accommodate storage of embeddings (e.g., full embeddings) in an encrypted format for future/subsequent retrieval.

The centroid IDs can then be indexed, for example using one or more encrypted search techniques set forth in U.S. Pat. No. 11,423,028 (incorporated by reference herein) and/or as set forth in U.S. Provisional Patent Application No. 63/488,151, filed Mar. 2, 2023 and titled "Method and System for Secure Search Over Encrypted Data," the contents of which are incorporated by reference herein in their entirety for all purposes. Although the embedding and quantization processes described above are described as being distinct/discrete processes with different associated models, in other embodiments contemplated by this disclosure, one or more embedding models maybe merged or combined with one or more quantization models such that the merged or combined model can automatically generate quantized embeddings directly from an input data.

Secure Search Over Encrypted Data

In some known search systems, data is decrypted prior to searching, which can compromise user privacy and confidentiality. To address this issue, one or more embodiments of the present disclosure provide a system and method for performing searches of/over encrypted data without compromising user privacy. For example, in some implementations, "forward privacy" techniques are used, to ensure that retrieved document identifiers remain encrypted even when the server performs the search.

In one or more embodiments, a system for performing searches over encrypted data includes at least one client device (e.g., a compute device including a processor and memory) and at least one server (e.g., a compute device including a processor and memory, optionally in wireless and/or wired communication with the at least one client device). The client device(s) can be configured or programmed (e.g., in software and/or hardware) to perform at least the following three processes, as part of a search of encrypted data (also referred to herein as "encrypted data search"):

1. Indexing a user's encrypted data by generating private search tokens (e.g., performed by index engine 112E in FIG. 1, discussed below);
2. Encrypting the user's search query (e.g., performed by encryption/decryption engine 112F in FIG. 1, discussed below) and transmitting the encrypted search query to the server; and
3. Decrypting (e.g., performed by encryption/decryption engine 112F in FIG. 1, discussed below) and parsing the results from the search server (e.g., performed by parsing engine 112G in FIG. 1, discussed below).

Figure 2:
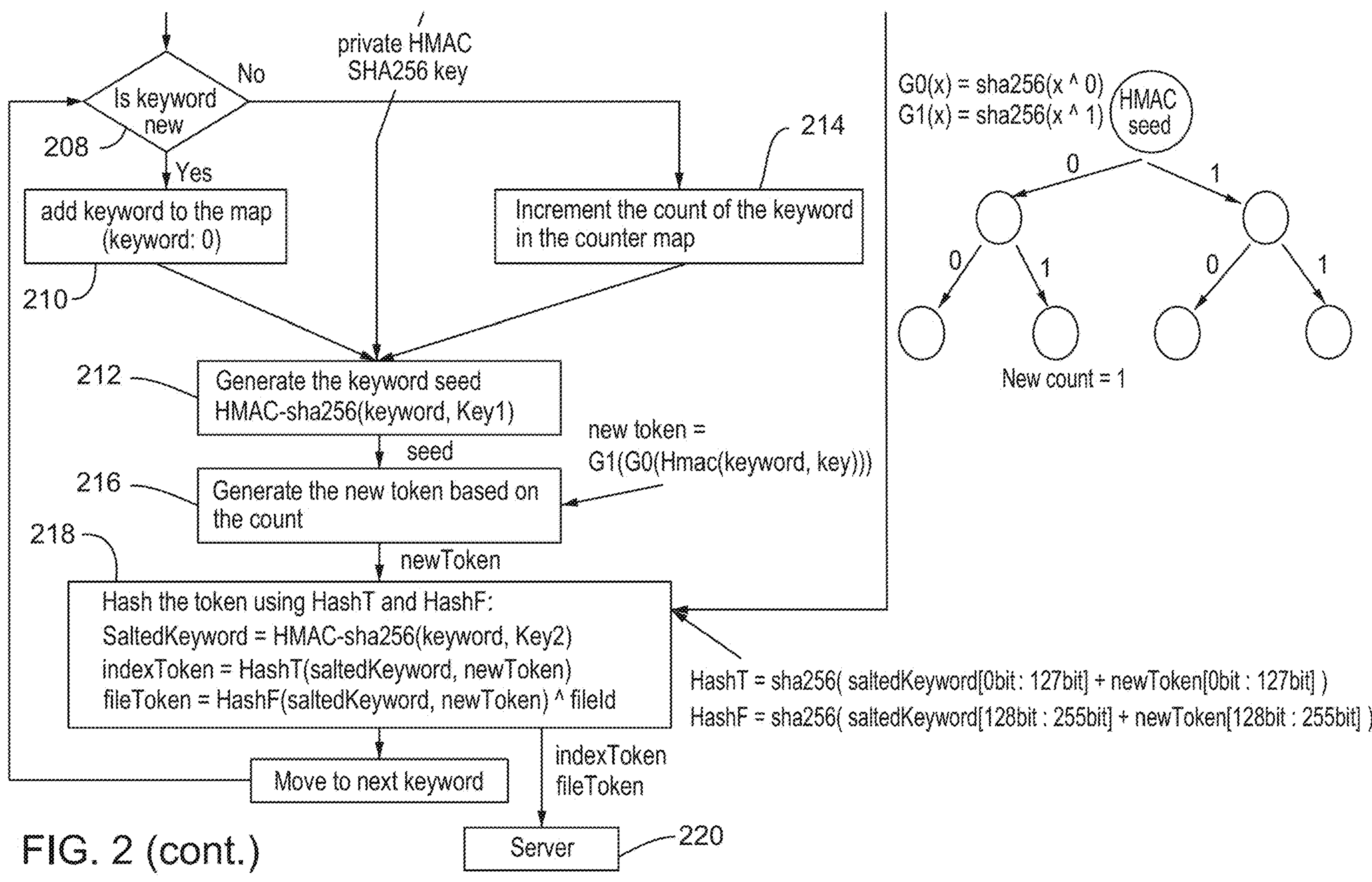
FIG. 2 is a flow diagram showing an example method for indexing encrypted data, according to one or more embodiments.

The first process performed by the system (e.g., system 100), in accordance with one or more embodiments, is indexing the user's encrypted data (which may include, for example, one or more documents). An example indexing process is shown in FIG. 2 and described in further detail below. Before being encrypted, the data can be parsed to isolate every unique keyword (e.g., a unique keyword can refer to a keyword that appears exactly once within a given corpus of data). Next, the system may (e.g., subsequent to the parsing) remove keyword(s) that do not need to be retrieved as part of the encrypted search (or that are determined by the system as not implicated when identifying matches in the context of the encrypted search), such as "stop-words" (e.g., "the," "they," "a," "an," "is," "are," etc.), if applicable, and transform the remaining keywords into encrypted search tokens (also referred to herein as "private search tokens") that, in turn, are sent to the server for storage and/or use in future searches. As used herein, a "keyword" can refer to a centroid identifier and/or a lexical word. When the keyword includes only centroid identifiers, the removal of stop-words may not be implicated/performed. In some implementations, the server stores the encrypted search tokens using a technique that involves merging encrypted search tokens that start with the same N bits (i.e., encrypted search tokens whose first N bits are in common) into the same database row. This approach reduces the number of rows used for storing the encrypted search tokens, while maintaining their uniqueness. Additionally, document identifiers (e.g., file name, author, date created, string(s), number (s), etc.) associated with the encrypted search tokens, merged encrypted search tokens, and/or database rows can be encrypted such that only the user can access the retrieved files.

Figure 3:
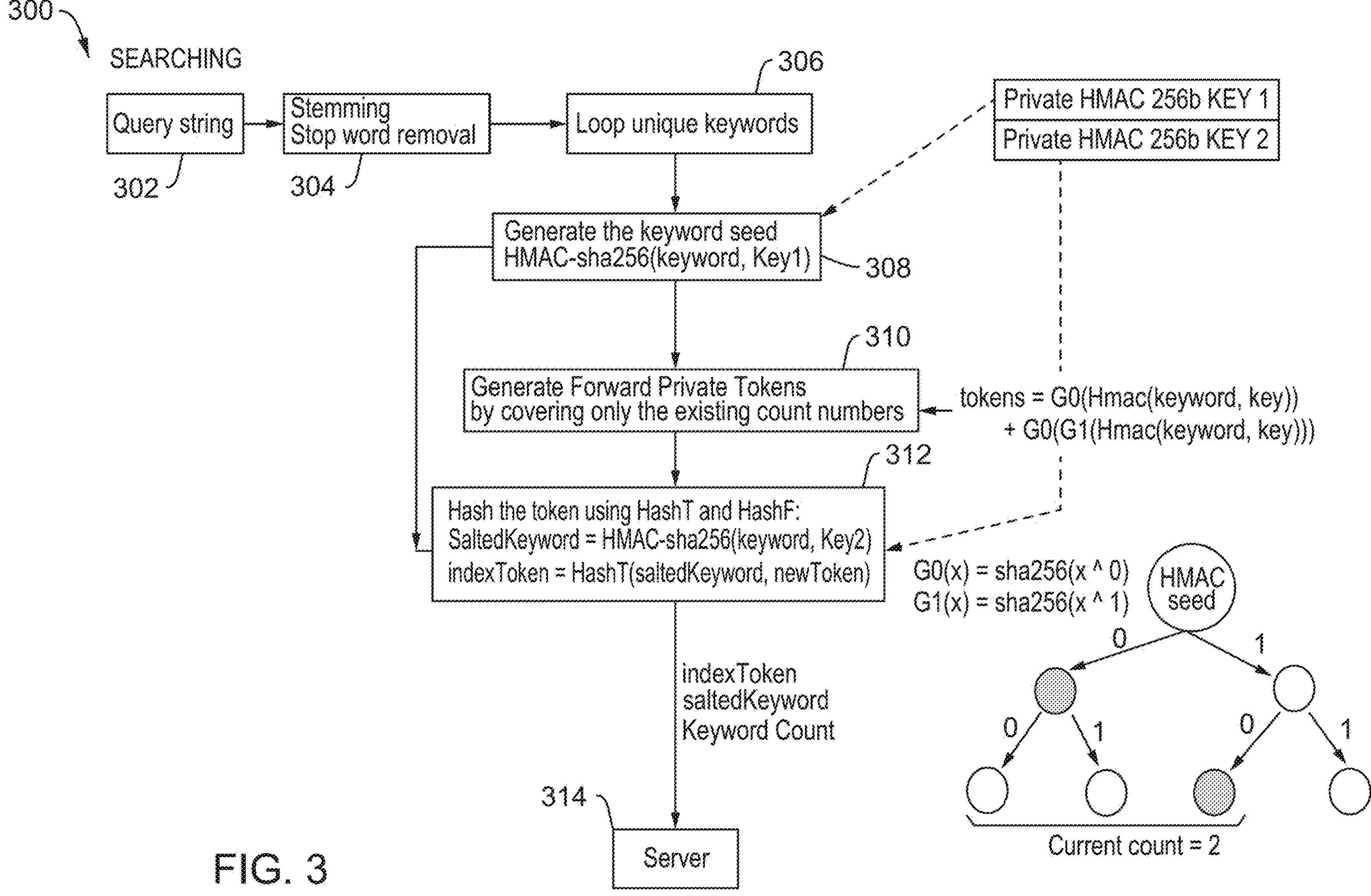
FIG. 3 is a flow diagram showing an example method for searching encrypted data, according to one or more embodiments.

To ensure user privacy, and in accordance with one or more embodiments, the system can generate one or more private search tokens for each keyword to be indexed, using a private key. These private search tokens can be generated, for example, using a technique referred to herein as "forward privacy," which ensures that the private search tokens are/remain encrypted and cannot be traced back to the original document, keyword (e.g., centroid identifier), or other associated data, and which ensures that two documents/datasets containing the same keywords cannot be linked. A one-way hash function may be used to generate the private search tokens. When a new file is indexed and contains a keyword that has already been indexed in a previous document, the system can "rotate" the token using a derivation technique, such that two tokens generated from the same original keyword cannot be linked. "Rotation" of the token, as used herein, can refer to a cryptographic operation that takes a value and transforms the value in a deterministic but non-reversible way (e.g., as used in key-lengthening algorithms). Forward privacy techniques of the present disclosure can be used to ensure that the query and the retrieved document identifiers remain encrypted, even when the server performs the semantic similarity search. This ensures that even if an attacker gains access to the server, they will not be able to decrypt the retrieved document identifiers and the keywords that they contain. An example encrypted data search process is shown in FIG. 3 and described in further detail below.

One or more embodiments of the present disclosure provide numerous benefits over known search systems, including enhanced privacy and security for users. By keeping document identifiers encrypted and using a merged encrypted search token technique as discussed above for storing encrypted search tokens, the systems of the present disclosure can ensure that user data remains confidential, protected and stored in a more efficient way than in known methods.

In one or more embodiments, an encrypted search process includes generating an encrypted query by generating a "trap door" and specifying a number of times that the trap door is to be derived, followed by decrypting and parsing the search results returned by the server. A client device can decrypt the document identifiers returned by the server using the private key that only the client device possesses. The client device may then parse the results and present them to the user (e.g., via a graphical user interface (GUI) of the client device, and in a human-readable format). In some implementations, the client device does not reveal the query or the document identifiers to the server, thereby ensuring that the user's privacy is preserved.

One or more embodiments of the present disclosure facilitate performing searches (e.g., automated searches) over encrypted data. By using forward privacy techniques and a unique technique for storing encrypted search tokens, the system ensures that user data remains secure and private. The system is efficient and provides numerous benefits over traditional search systems.

FIG. 1 is a system block diagram of a system for performing end-to-end encrypted semantic searches/searches of encrypted data, according to one or more embodiments. As shown in FIG. 1, the system 100 includes one or more servers 120, each of which includes a processor 121 in communication with a memory 122 and a transceiver 126 for wireless and/or wireless communication (e.g., via a wireless network N) with one or more client devices 110. The one or more servers 120 optionally include a user interface 128 (e.g., a graphical user interface (GUI)) through which a user U can input a search term or other search criteria, and through which a user can, for example, trigger and/or control one or more phases of the encrypted semantic search procedure described herein (e.g., hyperparameter selection, model training, data ingestion and/or query response retrieval) and/or view search results that are generated by the server 120 in response to the search term/query provided by the user. In some implementations, the user interface 128 can also be used so that a user U can input a search term or other search criteria, and a user can view search results that are generated by the server 120 in response to the search term/query provided by the user. The memory 122 can also store search queries 122A, which may include historical search queries (e.g., with associated keywords 122B) previously performed by the one or more servers 120. The memory 122 also can also store one or more of: merged encrypted search tokens 122C, encrypted data 122D, hyperparameters 122E, dimensionality of embeddings data 122F, subvectors 122G, centroid data 122H (e.g., including centroid IDs 122I and/or "Top X" centroids data 122J), one or more embedding models 122K, one or more clustering models 122L, plaintext data 122M, or full embeddings 122N. The memory 122 also stores instructions 122O (e.g., processor-readable software instructions) to perform one or more methods as described herein. In some implementations, search queries 112A may include historical search queries (e.g., with associated keywords) previously requested by the user U. The memory 112 also can also store one or more private search tokens. 112C as described herein. The memory 112 also stores an index engine 112E (e.g., configured to perform the method 200 shown in FIG. 2), an encryption/decryption engine 112F, and a parsing engine 112G. Each of the index engine 112E, the encryption/decryption engine 112F, and the parsing engine 112G can be implemented in software and/or hardware.

The system 100 also includes one or more client devices 110, each of which includes a processor 111 in communication with a memory 112 and a transceiver 116 for wireless and/or wireless communication (e.g., via a wireless network N). The one or more client devices 110 optionally include a user interface 118 (e.g., a graphical user interface (GUI)) through which a user U can input a search term or other search criteria, and through which a user can view search results that are generated by the server(s) 120 and/or by the client device(s) 110, in response to the search term/query provided by the user. The memory 112 can store search queries 112A, which may include historical search queries (e.g., with associated keywords 112B) previously requested by the user U and/or performed by the one or more servers 120 and/or by the client device(s) 110. The memory 112 also can also store one or more of: private search tokens 112C, encrypted data 112D, an index engine 112E (e.g., configured to perform an indexing process), an encryption/decryption engine 112F, and a parsing engine 112G (each of the index engine 112E, the encryption/decryption engine 112F, and the parsing engine implemented in software and/or hardware), centroid data 112H (e.g., including centroid IDs and/or "Top X" centroids data), one or more embedding models 112K, one or more clustering models 112L, plaintext data 112M, or full embeddings 112N. The memory 112 also stores instructions 112O (e.g., processor-readable software instructions) to perform one or more methods as described herein.

Client device(s) 100 can send, via transceiver 116 and using network N, encrypted search query 130 to server(s) 120. Server(s) can send, via transceiver 126 and using network N, encrypted search result(s) 140.

Database 150 can be communicatively coupled to server (s) 120 and/or client device(s) 110 via network N. In some implementations, database 150 is communicatively coupled to server(s) 120 but not client device(s) 110 via network N. In some implementations, database(s) 150 can be used as a database/key-value store, as described herein. Database 150 could store, for example, encrypted indexes. Although FIG. 1 shows database 150, in some implementations, database 150 is not used. For example, encrypted indexes can be stored at server(s) 120 and/or a compute device not shown in FIG. 1.

FIG. 2 is a flow diagram showing an example method 200 for indexing encrypted data (e.g., using system 100, and optionally the index engine 112E of FIG. 1), according to one or more embodiments. Said differently, FIG. 2 is a flow diagram illustrating the indexing process, method 200, for creating and managing encrypted search tokens (e.g., within system 100), in accordance with one or more embodiments. The method 200 starts with the input of a document and/or the document's keywords at 202. The document's keywords then undergo stemming (e.g., removing prefixes and suffixes from keywords) and stop-word removal to distill the essential keywords at 204. These keywords are then checked for uniqueness against the map of keywords and stored appropriately (e.g., at client device(s) 110, server(s) 120, and/or the like) at 206. The map of keywords can include each unique keyword and a numerical counter for each keyword (denoting the number of documents in which this keyword has occurred). The map of keywords is sometimes referred to as "counter map" or "keyword map" herein. At 208, if a keyword is unique, the keyword is added to the map of keywords at 210, a process that involves generating a keyword seed using a hash algorithm (e.g., a private HMAC SHA256) key at 212. If the keyword is not unique at 208, method 200 proceeds to increment the count of the keyword in the counter map at 214 and perform 212 thereafter. A new token is generated based on the count, keyword, and seed at 216. At 218, the new tokens are hashed using, for example, HashT and HashF functions shown in FIG. 2, and combined with a salt to create a salted keyword. In some implementations, HashT and HashF are two different hash functions using a secure hashing algorithm, such as SHA256. The outputted hash is XORred with the file ID (so the file ID cannot be guessed) that is to be stored on the database and later retried. HashT can hash to the token, while HashF can hash the file ID. In some implementations, before sending a search token and field, HashT is run on the search token and HashF is run on the field. At 220, this salted keyword and the new, index token generated at 216 are then stored in the server for later retrieval during the search process. FIG. 2 also illustrates a tree diagram with root note "HMAC seed." The tree diagram can be a constraint pseudorandom function (PRF), where G0 is a SHA256 hash of an input ("x") XORed with 0 and G1 is G0 is a SHA256 hash of the input ("x") XORed with 1.

The private HMAC SHA256 key used at 212 can be generated based on an account creation at 222. Thereafter, 230 includes keystore generation, which can include generating an additional private HMAC SHA256 key and a private AES256 key. One or more of the private AES256 key, first private HMAC 256*b* key, or second private HMAC 256*b* key can be used at 224 for keyword map creation. The keyword map created at 224 and private AES256 key can be used at 226 to generate an encrypted keyword map that is sent to the server at 228.

FIG. 3 is a flow diagram showing an example method 300 for searching encrypted data (e.g., using system 100, and optionally the parsing engine 112G of FIG. 1) to identify data semantically similar to the data provided by a query, according to one or more embodiments. Said differently, FIG. 3 is a flowchart depicting the searching process, method 300, within the system, according to one or more embodiments. The method 300 begins at 302 with the user's query string, which may include text data that the user wants to receive semantically similar text(s) for. The user's query string is then processed by stemming and optional stop-word removal (e.g., using the same or similar stemming and/or stop-word removal technique as in 204 of method 200), where applicable, to isolate the unique keywords (e.g., including centroid identifier(s) and/or lexical word(s)) at 304. These unique keywords are then looped (e.g., iterate through each unique keyword) at 306 to generate a keyword seed using, for example, HMAC SHA256 with a private key at 308. The system generates Forward Private Tokens at 310, ensuring that only the existing count numbers are covered. Said differently, only keywords (centroid IDs) which have occurred in the index (therefore are present in the keyword map) are used to generate private token. At 312, the tokens are then hashed with, for example, HashT and HashF to produce a salted keyword, which, along with the index token and keyword count, are used to query the server. At 314, the server then retrieves and delivers the encrypted search results to the client device. Method 300 also illustrates the use of two private HMAC SHA256 keys in the token generation process at 308, allowing the server to retrieve all previous tokens in the hash tree. FIG. 3 also illustrates a tree diagram with root note "HMAC seed." The tree diagram can be a constraint pseudorandom function (PRF), where G0 is a SHA256 hash of an input ("x") XORed with 0 and G1 is G0 is a SHA256 hash of the input ("x") XORed with 1.

Disclosed Encrypted Search—A Secure and Efficient Solution

Hash Vectorization (HV) Model

According to some embodiments, the disclosed Encrypted Search (sometimes referring to herein as "encrypted search") and its underlying compression algorithm, Stealth (sometimes referred to herein as the "stealth algorithm"), use hash vectorization (HV) models to facilitate secure searching of encrypted data. An HV model is a secure, one-way hash index that is produced as a byproduct of a compression process, for example during the modeling phase of Lempel-Ziv (LZ) parsing. Additional details regarding LZ parsing are set forth below (see "LZ Modeling" section) and can also be found in U.S. provisional patent application No. 63/056,160, filed Jul. 24, 2020 and titled "Double-Pass Lempel-Ziv Data Compression with Automatic Selection of Static Encoding Trees and Prefix Dictionaries," the entire contents of which are incorporate by reference herein.

In some embodiments, an HV model includes a hash filter and a chain vector (collectively, a "hash index"). The hash filter can be a Boolean quotient filter (e.g., similar to Bloom filters) that allows for the quick elimination of negative query assessments. The hash filter can be followed by a chain vector, which provides spatial modeling of hashed elements throughout the compressed data and the encrypted data, facilitating higher levels of accuracy, efficiency, and query expressiveness.

In some embodiments, when a file is compressed using the stealth algorithm, the file is divided into chunks (also referred to herein as "data chunks") of a predefined or specified size (e.g., 64 KB each). The first part of LZ-family compression includes modeling the input data (the chunks) to find redundancies and map entropy for compression. This process can be referred to as LZ parsing, and in the context of the stealth algorithm, this process can be referred to as stealth double pass modeling (SDPM). SDPM includes two passes. The first pass includes mapping out the entire input buffer by hashing strings of a fixed size (e.g., 4 bytes each), using a hash table to find the last position of each hash (the previous potential redundancy, or the location of the last occurrence of the hash within the input buffer), and placing the last positions in a hash chain (which may be similar to, for example, a Markov chain). By the end of the first pass, a hash chain, having a length that is the same as a length of the input data, is filled/populated with positions of matches, with each position linked to the previous position having the same hash value. In other words, the most recent occurrence of each hash can be stored at a given position in the input bytestream, such that every byte has a reference to the previous hash match. Hence, the hash chain has a length that is the same as the input data/input bytestream length. The hash chain is used in the second pass of SDPM to enable compression by finding ideal matches in the data, mapping those ideal matches, and encoding the mapped ideal matches and any remaining bytes during an entropy coding phase.

In known data compression environments, hash tables and Markov chains (or equivalents) are used solely for compression modeling, and are discarded after encoding. A considerable amount of information about the input data is in hash tables and Markov chains, however, and that information can be repurposed for search purposes, as discussed in connection with embodiments of HV models set forth herein.

HV Models—Part 1: Hash Filter

As discussed above, in some embodiments, an HV model includes a hash filter and a chain vector. The hash filter is a "broad" (or "coarse") filter that quickly eliminates most negative query candidates (i.e., subsets of data in a data set that are determined not to satisfy the query or not likely to satisfy the query). Query candidates are also referred to herein as "match candidates." By virtue of its need for fast performance, the hash filter is also elegantly designed.

Hash filters are a type of quotient filter with Boolean (e.g., true or false) data points about each hash value in the compressed/encrypted data. The first pass of SDPM uses a hash table of a given size (e.g., 65,536 hash values). At the end of SDPM's first pass, when a given position in the hash table contains a value, it can be concluded that the corresponding hash value has occurred somewhere in the input data. Due to the entropic nature of hashing, this means that any of the potential byte strings producing that given hash value could have occurred in the hash filter, an uncertainty that could potentially lead to false positives (i.e., hash collisions).

In some embodiments, one bit (0/1) is assigned to each hash value at the end of the first SDPM pass, to produce a hash filter. The size of this hash filter, in bits, will be equal to the size of the hash table (for example, a 65,536-hash value sized hash table will produce a hash filter of 65,536 bits, or 8,192 bytes). This size can be reduced significantly (as discussed below, in the "Optimizing HV Models" section).

When performing a search, hash filters can be used, as a first test to eliminate most negative candidates, by hashing the search pattern or keyword in the same manner as SDPM's first pass, and assessing the corresponding bits of the hash filter for each computed hash value. If any of the bits are 0, it can be concluded that the search pattern or keyword did not occur in the input data. Otherwise (i.e., if none of the bits are 0), the search pattern or keyword may have occurred in the input data. Confirmation can be performed during the second part of the HV model—the chain vector, discussed further below in the "HV Models Part 2: Chain Vector" section.

HV Models Part 2: Chain Vector

According to some embodiments, a second part of the HV model is the chain vector. A chain vector includes a "distilled" copy of the hash chain that is used for search purposes, and that includes a collection of n chains, where n is the number of different hash values occurring in the input data. Instead of containing the exact position of each potential value, the positions are approximated by grouping the positions into buckets (e.g., bucket 0: positions 0-255; bucket 1: positions 256-511, etc.), resulting in a "distilled" copy of the hash chain, which reduces storage space. Chain vectors, like hash filters, can be produced as a byproduct of the SDPM process, and can offer significantly more granular search capability than hash filters, though at the expense of greater computational complexity. As a result, chain vectors may be reserved for query candidates that are not eliminated by hash filters, and as such, applied to a considerably smaller subset of candidates, as compared with an initial set of query candidates processed by the hash filters.

As discussed above, a first pass of SDPM can produce a hash chain, which is a linked list of positions sharing the hash values. In other words, the hash chain links a position of every byte string matching a hash value with a previous byte string having the same hash value. This process effectively creates a "road map" of the input data with respect to the hash value. The hash chain can be used for compression purposes, by "chaining" all possible matching values together and quickly identifying a best match.

The spatial linking of byte string positions by hash value helps with identifying optimal or near-optimal matches for data compression purposes, and also proves highly efficient for evaluating the presence of complex, multi-hash patterns for queries. This can be achieved by turning the SDPM hash chain into a chain vector that can then be used for encrypted search purposes.

In some embodiments, chain vectors describe the locations at which a given hash value occurs in the compressed/encrypted data (i.e., "position data" of the hash value). By hashing the sub-strings of a search pattern (e.g., using any hashing procedure set forth in the "LZ Modeling" section below), multiple hash values can be produced, and the chain vector can be used to determine whether all of these hash values occur in the same region of the data. If all of these hash values do occur in the same region of the data, it can be concluded that there is a statistically significant chance that the queried pattern occurs in the data. If all of these hash values do not occur in the same region of the data, it can be concluded with certainty that the pattern does not occur.

In some embodiments, to transform a hash chain into a chain vector, individual chains for each occurring hash value can be extracted from the hash chain. As noted above, these individual chains include n positions, where n represents a number of occurrences of the given hash value in the input data. To avoid saving all positions in the chain vector, which would involve more storage space than the input data itself, the input buffer can be grouped into "buckets" (or "groups"), such that all positions in the hash chain occurring within the range of a given bucket will be identified by that bucket. The process of grouping the input buffer contents into buckets can significantly reduce the number of hash elements that are saved in the chain vector, while also reducing the range of possible positions, thereby significantly reducing the size of the chain vector. The process of grouping the input buffer contents into buckets also has security advantages, in that it can mitigate/prevent the reconstruction of the original data from which the HV Model has been produced. The process of grouping the input buffer contents into buckets can be performed more aggressively (with larger bucket sizes) or less aggressively (with smaller bucket sizes), which will yield different tradeoffs between chain vector size and granularity.

In some embodiments, the chain vector contains or enumerates the identifiers for each bucket that contains a given hash.

In some embodiments, bucket sizes are customizable, for example depending on a size of the input, a type of data being processed, a desired size of the HV Model and/or a desired size of the filter. A maximum number of buckets per chain, also referred to herein as "chain size," can be set such that every chain can be represented using the same number of bits independently of the number of buckets it represents. As a result, the number of occurrences of a hash value cannot be determined/inferred based on the chain size, and cryptoanalysis techniques such as frequency analysis are prevented, thereby improving the security of the chain vector.

In other embodiments, to protect the integrity of the chain vector, some or all chains may be individually/independently encrypted, for example with a 80-bit private key and using a 24-round Feistel encryption. Alternatively, the encryption can use another cipher method and key size. The encryption can be applied in the same manner, or in a common manner, across all chains.

A N-bit header can be appended to each encoded chain, specifying the encoding method used (e.g., specifying the bucket size used to encode that chain), where N=log 2(Number of different bucket sizes).

Searching with HV Models

HV models of the present disclosure are constructed with security, query expressiveness, and efficiency in mind. To that end, in some embodiments, performing an HV model search includes three steps: hashing the search pattern, scanning the hash filter, and grouping the chain vector into buckets. Additional steps can be included in the HV model search, for example to expand query expressiveness (e.g., AND, OR, ranges, etc.). The foregoing three steps, however, give a broad overview of the main search procedure.

As noted above, in some embodiments, the first step of an HV model search is hashing the search pattern. Unlike known hash-based search methods (e.g., quotient filters), according to some methods set forth herein, an entire search pattern (or "element") is not hashed at once. Rather, the search pattern is divided into substrings that are independently hashed. This improves security by randomizing the hash filter while facilitating querying techniques such as partial matching.

In some embodiments, hashing the search pattern includes using a sliding window of a predefined fixed size such as 4 bytes, in which the search pattern is advanced or "slid" across, one byte at a time, and performing a hash of each subsequent substring. The number of hashes produced from a single search pattern can be equal to the difference of the pattern size and the hash plus one. For example, a search pattern of 5 bytes with a hash size of 4 bytes will produce 2 hashes ($h_1$ [0-3], $h_2$ [1-4]).

Once the hashing step is completed, hash filter scanning can commence (e.g., automatically and without human intervention). As discussed above, hash filters include Boolean (true/false) values for each hash value occurring within the compressed/encrypted data. The use of hash filters can involve minimal computation during searching, resulting in faster, more efficient performance. For each computed hash value searched, a corresponding/associated hash filter bit is checked (e.g., hash value 6,512 will correspond to the 6,512$^{th}$ bit). Should all corresponding bits be true (1), it can be concluded that there is a significantly high likelihood that the compressed/encrypted data contains the search pattern, and that compressed/encrypted data is flagged for chain vector grouping. Alternatively, should any of the bits be false (0), it can be concluded that there is a 0% chance that the pattern has occurred, effectively eliminating the compressed/encrypted data as a candidate for containing the search pattern.

In some embodiments, in a next (optionally final) step, chain vector grouping, is performed, and is reserved for the subset of compressed/encrypted candidate chunks (or data chunks) that were not eliminated by hash filter scanning. As discussed herein, chain vectors are more granular than hash filters, facilitating higher levels of search accuracy and query expressiveness, while costing some computational overhead on the order of O(log(n)). During a search, the chain vector can be used to isolate areas of the compressed/encrypted data that contain the search hashes, and to group them and determine whether their approximate positions (also referred to herein as "position data") would permit the original search term to occur or not.

In some embodiments, chain vectors include two parts: (1) a header including chain sizes, and (2) vectorized chains. The hash filter can be used to determine which hash values occur in the chain vector. For each hash value that occurs in the chain vector, a corresponding or associated vector size can be stored in the header. Once the vector sizes for each search hash are determined using this header, the respective vectors for each hash can be read. Each vectorized chain represents the regions, or "buckets," of the compressed/encrypted data in which the respective hash occurs. By comparing the vectors of each search hash, it can quickly be determined whether they align properly (e.g., are adjacent or in close enough proximity) to form a match of the original search pattern. For example, should the two searched hashes occur in buckets 1 and 5, then they are not in the same region of data, and therefore cannot have occurred together to have formed the original search pattern. However, if they had both occurred in the same or adjoining buckets, then there is a very significant chance (e.g., >99%) that the compressed/encrypted data contains a match for the query. The relevant data region(s) can then be flagged for partial decryption & decompression, and used accordingly.

Optimizing HV Models

Three considerations for optimizing HV Models are accuracy, size, and performance. The accuracy and size of HV models can follow a direct correlation. For example, a larger HV model can produce more accurate results than a smaller HV model.

Encrypted Search—Encryption

In some embodiments, encrypted search includes a search capability as well as encryption. Encrypted search methods set forth herein, unlike known techniques, can use AES encryption and supports every cipher mode specified in the AES standard. As such, in some embodiments, encrypted search methods do not include any modifications to the encryption itself. The compatibility of encrypted search with existing AES encryption and its ability to support existing cipher modes are significant advantages over known techniques, since proposing new methods of encryption can involve extensive standardization, testing, and universal acceptance. These standardization and testing processes can take decades, as can be seen with AES's ongoing deployment (note that the standard was published in 2001). Any solution proposing new or modified encryption ciphers is therefore impractical for real-world applications.

Some embodiments of encrypted search can leverage existing encryption, such as AES, since a full search capability for encrypted data is implemented via the compression and production of HV models, both of which occur prior to encryption. This enables the HV model to be independently decrypted (e.g., by a cloud computing service), securely searched, and in turn provide actionable results without decrypting the original data or leaking otherwise-unintended information.

Salting & Token Randomization

Some known hash-based algorithms can be vulnerable to statistical and preimage attacks. These types of attacks exploit the deterministic nature of hashing, and map out every possible input for a given hash value, and use the entropy of these hash collisions to gain useful information about the encrypted data. To secure encrypted searches against such attacks, in some embodiments, a salting process can be used.

Salting can be used for safe credential storage, where a credential such as a password is hashed and saved in a database. To protect against the types of attacks described above, passwords can be concatenated with a cryptographically random value (a "salt"), which is also saved in the database. As a result, two identical passwords, with different random salts, will produce two different hash values. This effectively randomizes the hashing function, and deters most statistical attacks.

In some embodiments, an HV model employs a salting process, to a similar effect. For example, during a stealth compression process, a cryptographic nonce (e.g., a random value) is generated and used as a salt. Throughout the SDPM process, the salt is added to the input byte strings, repeatedly (e.g., sporadically, consistently, etc.) randomizing the hashing process. This has little to no impact on compression performance, but effectively randomizes the HV model. With this process, the output of the hashing process produced from identical data will be completely different, given the use of different salts.

For applications involving network transmission of queries, such as queries of cloud-based databases, the hashing and salting of search patterns can be performed on a (trusted) client, and the randomized, salted hash values can be transmitted to an (untrusted) server where a search may be executed. Such an approach effectively renders the server-based query process to be fully opaque, with neither the query nor the HV models providing useful information or security leakage. Further protection can be applied via the use of transport-layer encryption.

Query Approximation

In some embodiments, given the hash-based nature of HV models, false positive results may occur, however, false negative results can never occur. The level of accuracy (and therefore the size) of an HV model has a direct, inverse relationship with false positive rates. In other words, a larger (and therefore more accurate) HV model can produce fewer false positives than a smaller HV model. The difference can range from 10% to <0.1% false positives using the full HV model (i.e., the hash filter and the chain vector), and can have a much larger range (approx. 50%-15%) when only employing a hash filter (with no chain vector).

The range of false positives described above leads to query approximation—a degree of uncertainty with the veracity of provided results (some of which may also prove to be false positives). In a non-encrypted environment, this query approximation can be removed by confirming the search through a simple pattern matching algorithm (e.g., Boyer-Moore) on the original data. Encrypted search, however, prohibits the decryption of the data for searching purposes. As such, a degree of query approximation may be expected.

Query approximation, while potentially obscuring granular query results, also provides a layer of additional security against security compromise. Because an inherent degree of uncertainty exists for each hash element in the HV model, any attempt to analyze the HV model (assuming it is in a decrypted form) will prove exponentially more difficult with uncertainty, with a complexity close to $O((w)n^n)$, where w denotes the uncertainty plus one (between 1.0 and 2.0, inclusive) and n denotes the number of hash values to ascertain. This effectively adds a layer of security, should the encryption protection a HV model ever be compromised.

Chunking & Partial Decryption

In some embodiments, the compression algorithm underlying encrypted search—the stealth algorithm—divides input plaintext into chunks of data (e.g., 64 KB each), i.e., data chunks. This chunking, while sometimes performed for decompression efficiency purposes, also facilitates independent encryption and partial decryption of the searched data.

Since the original data is segmented into independent chunks, each chunk can be compressed and encrypted independently, thereby facilitating independent decryption and independent decompression, should a given chunk be flagged during a search. For example, if a HV model search isolates a given chunk for a positive query match, this chunk can be independently accessed without decrypting the entirety of the data of the encrypted file, which would render the entire encrypted file vulnerable. The chain vectors, by virtue of their accuracy, can even isolate the location of a match within a given chunk, providing a greater degree of granularity for targeted decryption/decompression.

Security Leakage

Encrypted search embodiments set forth herein enhance/optimize data security without compromising search efficiency and query expressiveness. In addition to preventing security leakage, encrypted search can reside or be built on existing standards, making it suitable for use in commercial applications. The encrypted search methods described herein can be used for a variety of applications, including cloud computing, electronic health records management, finance, analytics, and social media.

LZ Modeling

In some embodiments, an encoder is part of a "Lempel-Ziv" ("LZ")-modeled encoder family. LZ modeling makes it possible for the encoder/compressor to identify byte sequences that are similar to one another within an input bit stream. The identified similar byte sequences can, in turn, be used to compress the data of the input bit stream. For example, the first time that a given byte sequence appears within the input bit stream, the LZ modeling function may identify that byte sequence as a "literal byte" sequence. Subsequently, whenever the same byte sequence occurs, the LZ modeling function can identify that byte sequence as a "match." The foregoing process is referred to herein as "parsing" the data. As discussed above, when the parsing quality is higher, the compression ratio is typically also higher, however increasing the parsing quality can also result in a slower process. In view of this trade-off, multiple different embodiments of encoders (and associated methods) are presented herein, ranging from encoders having a fastest compression, to encoders having a slowest compression but a highest compression ratio. The encoder embodiments set forth herein leverage modern processor architectures, while innovating the manner in which data is parsed, for example using different numbers of passes based on the parsing quality selected.

In some embodiments, LZ modeling is performed on the encoder but not on the associated decoder, and the quality of the parsing used on the encoder does not affect the decoder speed.

Encrypted Index Storage

The storage of the encrypted index can impact the system's performance and/or scalability. In some embodiments, the index can be stored in one or more of the following locations: in-memory, on-disk, or in a database/key-value store.

In-memory storage can be used in, for example, applications where minimal retrieval latency is used. This option can provide sub-millisecond response times but may sometimes be limited by available RAM. On-disk storage provides larger index space but may have larger retrieval latency. Databases (such as key-value stores) provide a more scalable option while offering high search bandwidth, at the potential cost of additional latency. In some implementations, in-memory storage and/or on-disk storage is at server(s) 120, while database/key-value store is at database 150.

(E) Encrypted Semantic Retrieval

Encrypted semantic retrieval enables secure and efficient search operations within encrypted vector spaces. This process includes querying the encrypted index to find relevant data points based on their encrypted vector representations, all while maintaining the confidentiality of the query and data.

In one or more embodiments, a retrieval and/or querying process begins with an embedding of a query, using the same embedding mode used for indexing. The resulting embeddings (e.g., full embeddings which can also be referred to as not-yet-quantized "high-dimensionality" embeddings) are then ready for quantization. Depending on the index mode selection, the embeddings may be split/partitioned into a plurality of subvectors, with each subvector from the plurality of subvectors quantized using one or more trained clustering models from the aforementioned step. Alternatively, the embeddings may be directly quantized using coarse quantization. The quantization results in a series or set of centroid IDs.

While an encrypted search can be conducted on these centroid IDs, this method can have two key limitations, in some cases: 1) only indexed data within the same exact cluster would be matched, leading to potentially low recall as relevant nearby clusters would be ignored, and 2) in the case of IVF or PQIVF, the results within these clusters would be unranked. To address these limitations, some implementations are related to a concept named "cluster oversampling" (sometimes referred to herein as "oversampling"). Oversampling includes finding a number ("C," for example, where C is any number from 1 to the total number of clusters (from the hyperparameters)) of nearest cluster to a given embedding or subvector, and conducting an encrypted search for all C centroid IDs. This solves both aforementioned limitations by: 1) ensuring neighbor clusters are visited for relevant matches, and 2) as the cluster IDs are known, their distance from the query embedding can be precomputed to generate a composite score during the search process, which can then be used to rank the results based on a semantic similarity metric (such as Euclidean distance). This encrypted search could be performed using one or more encrypted search techniques described herein and, e.g., as set forth in U.S. Pat. No. 11,423,028 and/or in U.S. Provisional Patent Application No. 63/488,151 (each of which is incorporated by reference herein).

The results of the search (i.e., query result candidates) are aggregated, and in some implementations a composite distance/similarity score is computed for each query result candidate, facilitating high recall and precision while maintaining privacy. In some implementations, such as for precision-sensitive applications, the full embeddings of top candidate items can be retrieved and decrypted to refine the final similarity/distance score for each candidate. In other implementations, however, no decryption of data and/or queries is performed during the encrypted semantic search process. Regardless of whether decryption occurs during the semantic search process, the results of the search are returned to the user compute device/client (e.g., that initiated the query). The results of the search may include the composite results (e.g., results that are ranked by the composite distance/similarity score) or the final results (e.g., results that are ranked by the composite distance/similarity score).

Indexing and encrypted search techniques described herein, in accordance with some embodiments, can be performed within a TEE of a processor (i.e., a secure region within the processor and having an associated hardware isolation mechanism), such as processor 121 and/or 111 of FIG. 1. Moreover, any of the indexing 200 of FIG. 2, the searching 300 of FIG. 3, the data ingestion 400 of FIG. 4, and the data retrieval/querying 500 of FIG. 5 can be performed within a TEE.

Figure 4:
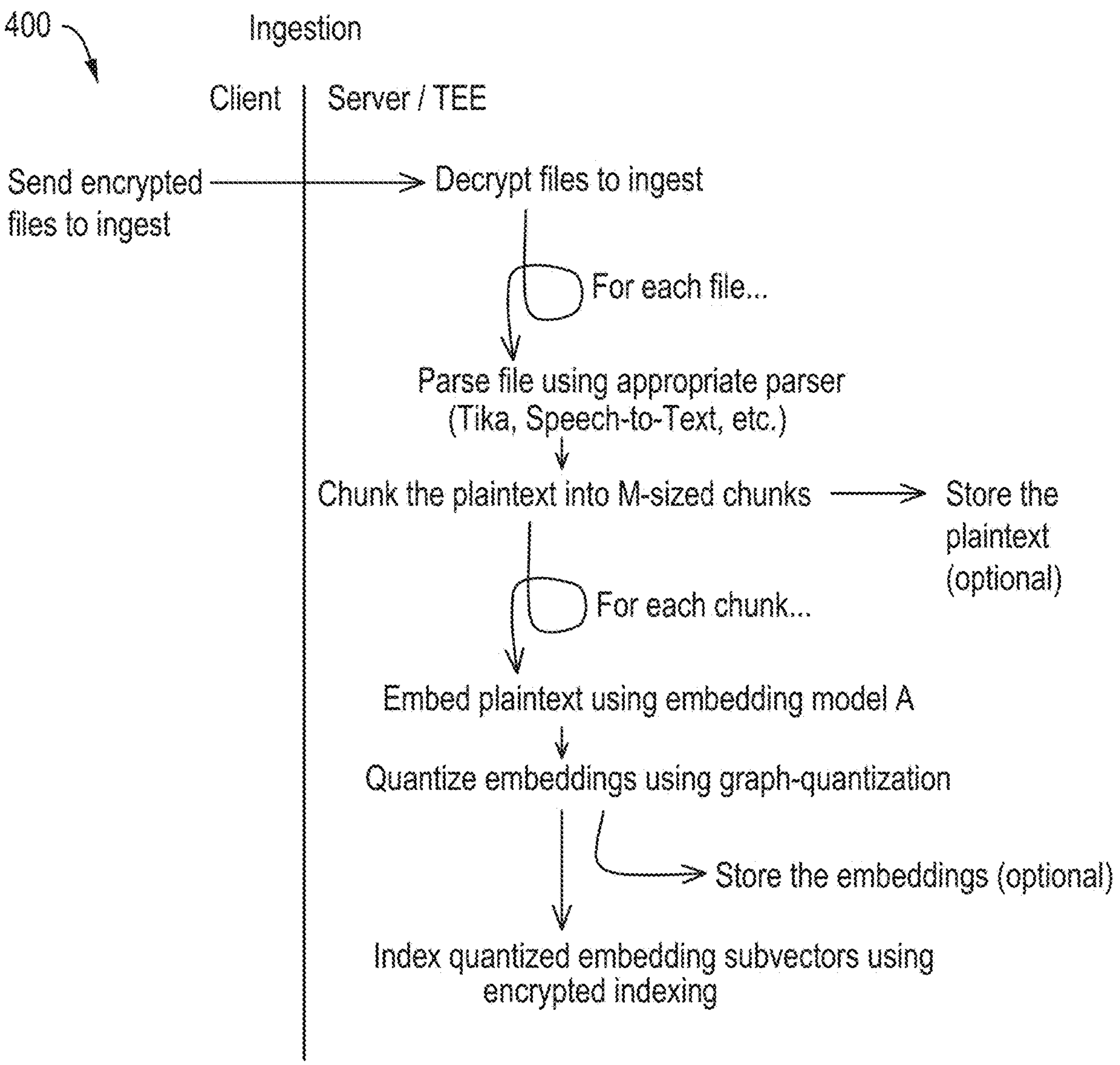
FIG. 4 is a flow diagram showing an example data ingestion process, according to one or more embodiments.

FIG. 4 depicts an example data ingestion process 400 (e.g., implemented using system 100 of FIG. 1), according to one or more embodiments. As shown in FIG. 4, a plurality of encrypted files can be received at a server (e.g., server(s) 120 of FIG. 1) having a TEE, from a client compute device (e.g., client device(s) 110 of FIG. 1) and/or from one or more other servers. At the server, files to be ingested are decrypted, to define a plurality of decrypted files, and each decrypted file from the plurality of encrypted files is parsed by the server using one or more suitable parsers (e.g., Tika™, speech-to-text, etc.), to produce plaintext associated with the plurality of encrypted files. The plaintext is partitioned, subdivided, or "chunked" by the server into a plurality of chunks (e.g., of uniform size). The plaintext is optionally also stored (e.g., in a memory of or accessible to the server). The plaintext of each chunk from the plurality of chunks is embedded by the server, using an embedding model, to produce a plurality of embeddings. The embeddings are then quantized by the server, e.g., using one or more quantization techniques, to produce a plurality of quantized embedding subvectors, and the embeddings themselves are optionally stored (e.g., in a memory of or accessible to the server). The quantized embedding subvectors from the plurality of quantized embedding subvectors are then indexed by the server, e.g., using encrypted indexing, to produce a plurality of indexed quantized embedding subvectors (also referred to herein as centroid IDs) that are subsequently used for matching and/or retrieval of search results during query processing.

Figure 5:
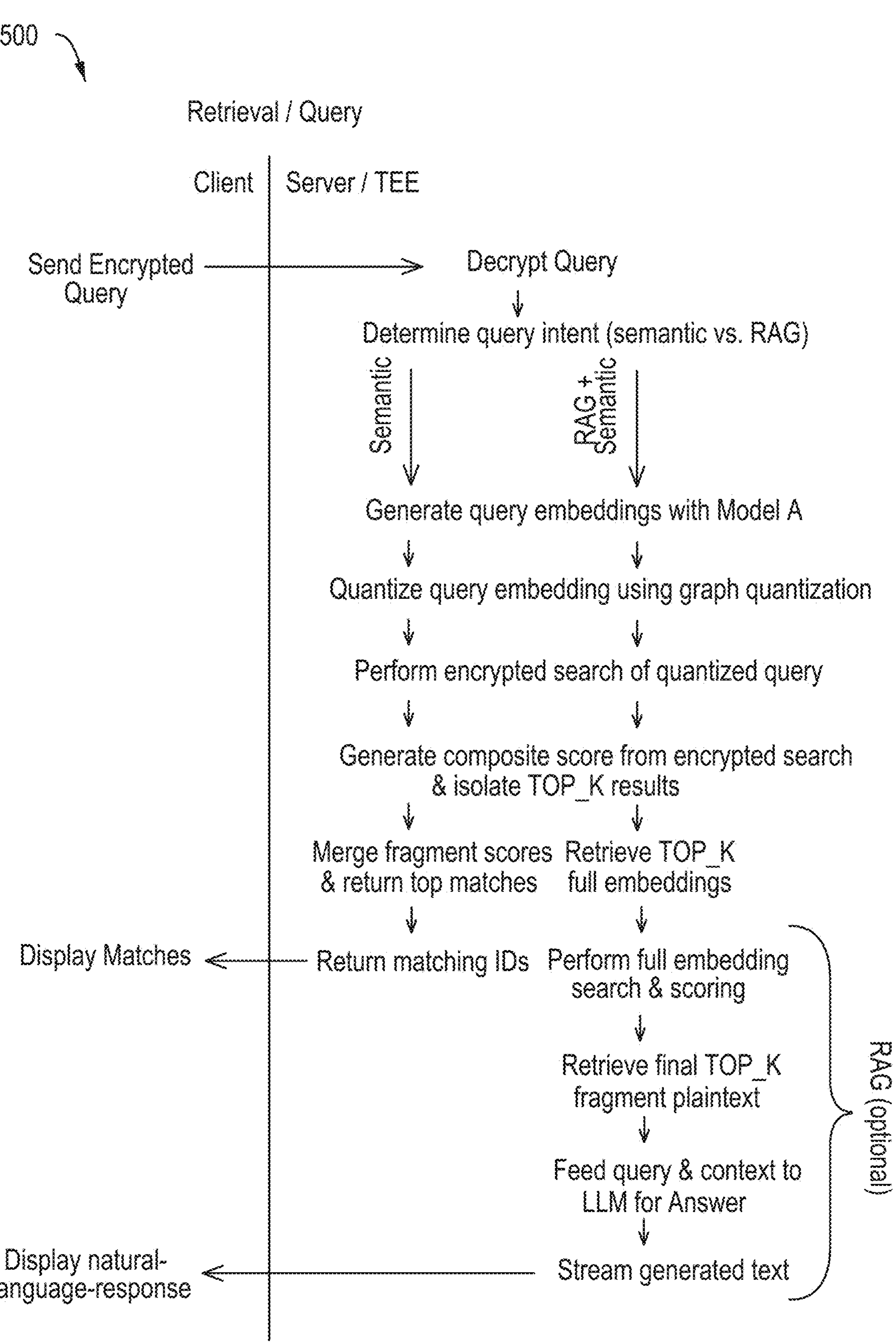
FIG. 5 is a flow diagram showing an example retrieval and query process, according to one or more embodiments.

FIG. 5 depicts an example retrieval and query process 500 (e.g., using system 100), according to one or more embodiments. As shown in FIG. 5, an encrypted query is sent from a client compute device (e.g., client device(s) 110 of FIG. 1) to a server (e.g., server(s) 120 of FIG. 1) having an associated TEE. The server decrypts the encrypted query within the TEE to generate a decrypted query, and determines based on the decrypted query a query intent (e.g., a search type such as semantic, or RAG+semantic). Since the TEE is part of an encrypted memory of the server that can only be accessed by the "client," or a user associated with the client compute device, no decrypted data is accessible to anyone other than the user during the retrieval and query process of FIG. 5. After determining the query intent (irrespective of whether semantic or RAG+semantic), query embeddings are generated by the server using an embedding model (e.g., embedding model(s) 122K of FIG. 1), the query embeddings are quantized at the server using fine quantization (also referred to as graph quantization) to generate a quantized query, and an encrypted search is performed by the server based on the quantized query. The server then computes a composite score based on the encrypted search results and identifies/isolates a set of 'TOP_K' results. If the query intent was determined to be semantic, fragment scores (e.g., cosine similarity/distance scores for each fragment of a document, if the document was split/divided into fragments) computed based on the encrypted search are merged, the top matches (e.g., fragments having the highest fragment scores) are identified/returned, and the matching IDs (e.g., identifiers associated with the top matches) are then sent from the server to the client compute device where they may be displayed (e.g., via a GUI of the client compute device). Alternatively, if the query intent was determined to be RAG+semantic, and optionally using a RAG, a set of 'TOP_K' full embeddings (i.e., the top results) are retrieved by the server based on the 'TOP_K' results that have been isolated, the server performs a full embedding search and scoring of the 'TOP_K' results, and final 'TOP_K' fragment plaintext is retrieved. The query and context are then fed by the server to an LLM to generate an answer (e.g., a query response), text representing the answer is generated and sent (e.g., streamed) to the client compute device to cause display of a natural-language response. By leveraging the use of a TEE in the foregoing retrieval and query process, significantly more computational resources can be made available, and significantly faster processing speeds can be achieved, relative to the same or similar operations being performed on a non-server/client compute device. These advantages can be especially useful in the context of RAG applications using an LLM.

Although the example retrieval and query process of FIG. 5 includes performing various processes (including decrypting an encrypted query) using a TEE of a server, in some alternative embodiments, one or more of the noted processes can instead be performed on the client compute device, to avoid or limit the use of a TEE.

Systems and methods described herein, according to one or more embodiments, are scalable, and use hyperparameters that facilitate near O(1) time complexity and at most O(log(n)) complexity for large datasets. The encrypted semantic search techniques described herein can improve performance metrics relative to known approaches, and can maintain high recall and precision over time, with significantly enhanced security and privacy relative to known approaches. This presents a substantial improvement over known search systems, particularly in sensitive data environments.

Integration with Generative AI Applications

The system(s) described herein, according to one or more embodiments, can be compatible with and/or can seamlessly integrate with Generative AI applications, for example Generative AI applications that perform Retrieval-Augmented Generation ("RAG"). When used with such applications, the system(s) can function as a secure retriever, for example to retrieve and provide relevant encrypted fragments and/or documents (collectively, "context") to the LLM for contextual processing. The LLM, which can be deployed in a variety of secure environments, including TEEs, can in turn use the retrieved context to generate informed and accurate responses without compromising the security of the underlying data.

Example Implementations and Use Cases

Encrypted Semantic Search in Healthcare

The system(s) described herein, according to one or more embodiments, can be compatible with and/or can be used in a healthcare context, to facilitate secure, system-wide semantic searches on Protected Health Information ("PHI") and/or Personally Identifiable Information ("PII") for research and analysis purposes, while adhering to/ensuring compliance with one or more privacy regulations. By way of example, epidemiologists can query data stored in/across multiple hospital databases, e.g., for pattern identification, without exposing sensitive patient data.

Encrypted RAG in Legal Research

The system(s) described herein, according to one or more embodiments, can be compatible with and/or can be used in a legal setting, to automate conflict checks and/or private case research. Law firms can utilize the encrypted RAG capabilities described herein, for example to securely access case law, client files and/or legal documents, ensuring client confidentiality and compliance with legal data protection standards.

Flowcharts

FIG. 6 shows a flowchart of a method 600 to generate a queryable encrypted index, according to an embodiment. In some implementations, method 600 is performed by a processor (e.g., processor 121 and/or processor 111).

At 602, at least one index parameter from a plurality of index parameters (e.g., hyperparameters 122E) is identified. At 604, an embedding model (e.g., embedding model(s) 112K) is selected based on the at least one index parameter. At 606, indexable data (e.g., plaintext 122M and/or preprocessed media) is generated based on parsed data. At 608, a plurality of embeddings (e.g., full embeddings 122N) are generated based on the indexable data and using the embedding model. Each embedding from the plurality of embeddings includes a vector representation of at least a portion of the indexable data. At 610, the plurality of embeddings are quantized based on the at least one index parameter and using at least one of the embedding model or a clustering model (e.g., clustering model(s) 122L), to generate a set of centroid identifiers (e.g., centroid ID(s) 122I). At 612, the set of centroid identifiers are indexed using an encryption technique to generate a queryable, encrypted index.

In some implementations of method 600, the plurality of index parameters includes at least one of a plurality of vector embedding model types, a plurality of quantization parameters, or a plurality of index modes. In some implementations, the plurality of index modes includes at least one of: inverted file ("IVF"), product-quantized inverted file ("PQIVF"), or IVF with product quantization ("IVFPQ").

In some implementations of method 600, the indexable data includes plaintext.

In some implementations of method 600, the indexable data includes preprocessed media.

In some implementations of method 600, the parsed data includes text and the indexable data includes plaintext.

In some implementations of method 600, the parsed data does not include text, and the plurality of embeddings includes multi-modal embeddings that represent at least one of audio or images.

FIG. 7 shows a flowchart of a method 700 to train and use an embedding model, according to an embodiment. In some implementations, method 700 is performed by a processor (e.g., processor 121 and/or processor 111).

At 702, at least one index parameter is identified from a plurality of index parameters (e.g., hyperparameters 122E). At 704, an embedding model is trained based on the at least one index parameter, to produce a trained embedding model (e.g., embedding model(s) 122K). At 706, data is received and the data is parsed to generated indexable data (see, e.g., FIG. 4). At 708, a plurality of embeddings (e.g., included in full embeddings 122N) are generated based on the indexable data and using the trained embedding model. Each embedding from the plurality of embeddings includes a vector representation of at least a portion of the indexable data. At 710, the plurality of embeddings is quantized based on the at least one index parameter and using the at least one of the trained embedding model or a clustering model (e.g., clustering model(s) 122L) to generate a set of centroid identifiers (e.g., centroid IDs 122I). At 712, the set of centroid identifiers are indexed using an encryption technique to generate a queryable, encrypted index.

In some implementations of method 700, the quantizing the plurality of embeddings at 710 includes performing coarse quantization.

In some implementations of method 700, the quantizing the plurality of embeddings at 710 is performed using a graph-quantization technique.

FIG. 8 shows a flowchart of a method 800 to perform an encrypted search, according to an embodiment. In some implementations, method 800 is performed by a processor (e.g., processor 121 and/or processor 111).

At 802, at least one embedding (e.g., included in full embeddings 122N) is generated based on a received query (e.g., encrypted search result(s) 140) and using an embedding model (e.g., embedding model(s) 122K). The at least one embedding includes a vector representation of the query. At 804, a first set of centroid identifiers (e.g., included in centroid ID(s) 122I) are identified by quantizing the at least one embedding. At 806, for a given embedding from the at least one embedding: a closest subset of centroid identifiers is identified from a second set of centroid identifiers (e.g., included in centroid ID(s) 122I) associated with indexed data; and an encrypted search is conducted based on the first set of centroid identifiers and the closest subset of centroid identifiers to generate a query result (e.g., encrypted search result(s) 140) for the received query.

In some implementations of method 800, generating the first set of centroid identifiers at 804 includes generating the first set of centroid identifiers by quantizing each subvector from a plurality of subvectors of the at least one embedding.

In some implementations of method 800, generating the first set of centroid identifiers at 804 includes generating the first set of centroid identifiers using at least one trained clustering model (e.g., clustering model(s) 122L).

In some implementations of method 800, generating the first set of centroid identifiers at 804 generating the first set of centroid identifiers by directly quantizing the at least one embedding using a coarse quantization.

In some implementations of method 800, the encrypted search at 806 is performed using a hash vectorization model. In some implementations, the encrypted search is performed using a hash vectorization model that includes a hash filter and a chain vector.

In some implementations of 800, conducting the encrypted search at 806 includes ranking each centroid identifier from the closest subset of centroid identifiers based on a distance between that centroid identifier and the given embedding from the at least one embedding (e.g., to determine top X centroids 122J).

In some implementations of method 800, conducting the encrypted search at 806 does not result in the decryption of the indexed data or of the query.

Some implementations of method 800 further include causing determine of a query intent based on the received query.

Some implementations of method 800 further include determining a query intent based on the received query and generating the query result at 806 includes computing and merging fragment scores computed based on the encrypted search when the query intent is semantic.

Some implementations of method 800 further include determining a query intent based on the received query, and generating the query result at 806 includes sending the query and context to a large language model (LLM) when the query intent is Retrieval Augmented Generation (RAG) and semantic.

FIG. 9 shows a flowchart of a method 900 to perform an encrypted search, according to an embodiment. In some implementations, method 900 is performed by a processor (e.g., processor 121 and/or processor 111).

At 902, a query string is received from a compute device (e.g., a remote compute device associated with a user/owner of sensitive data to be queried). At 904, at least one of stemming or stop-word removal is performed on the query string to identify at least one unique keyword associated with the query string. At 906, a keyword seed is generated based on the at least one unique keyword and using a hash-based message authentication code (HMAC). At 908, a set of at least one private token (e.g., private search token(s) 112C) is generated based on the keyword seed using a hash function and at least one private key. At 910, each private token from the set of at least one private token is hashed to generate a plurality of encrypted salted keywords. At 912, a signal is sent to a server (e.g., server(s) 120) to query the server using the plurality of encrypted salted keywords, at least one encrypted index token, and a keyword count associated with the query string to identify an encrypted search result (e.g., encrypted search result(s) 140) for the query string. At 914, a signal representing the encrypted search result is caused to be transmitted to the compute device for decryption and parsing.

In some implementations of method 900, the at least one private key includes at least one HMAC-SHA256 key.

In some implementation of method 900, the at least one private key includes a first HMAC-SHA256 key and a second HMAC-SHA256 key.

In some implementations of method 900, querying the server to identify the encrypted search result at 912 includes querying a keyword map of the server.

In some implementations of method 900, querying the server to identify the encrypted search result at 912 includes querying the server without decrypting any encrypted data stored at the server.

In some implementations of method 900, hashing each private token from the set of at least one private token at 910 includes hashing each private token from the set of at least one private token using a first hash function and a second hash function different from the first hash function.

In some implementations of method 900, performing at least one of stemming or stop-word removal on the query string at 904 includes performing both stemming and stop-word removal on the query string.

In some implementations of method 900, the hash function is a one-way hash function.

In some implementations of method 900, the hash function is a trapdoor function.

Figure 10:
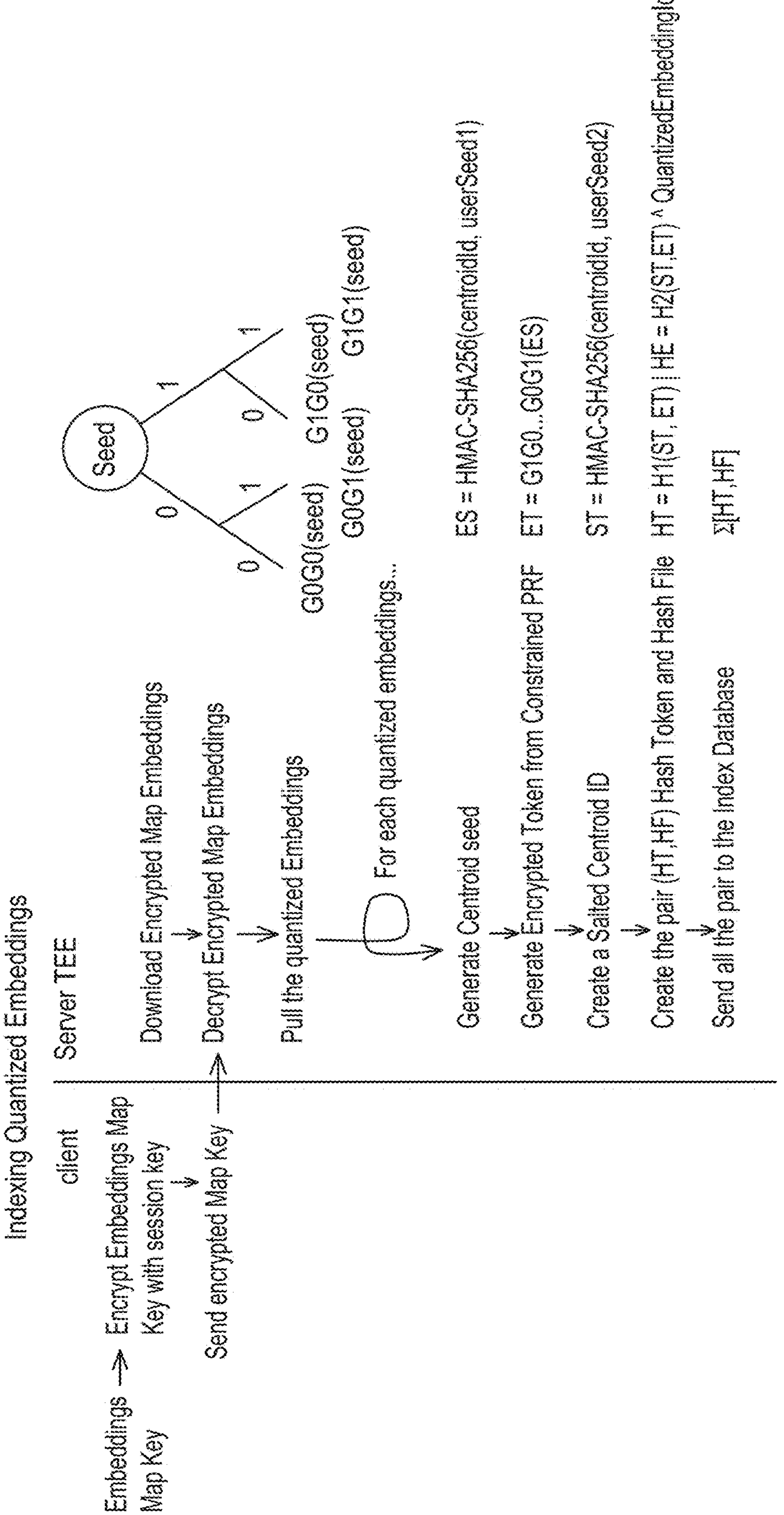
FIG. 10 illustrates indexing quantized embeddings, according to an embodiment.

FIG. 10 illustrates indexing quantized embeddings, according to an embodiment. At a client device (e.g., client device(s) 110), embeddings map keys are encrypted using a session key, and the encrypted map key is sent to a server device (e.g., server(s) 120). At the server device, encrypted map embeddings and downloaded and decrypted using the encrypted map key received from the client device. The quantized embeddings are pulled from the now-decrypted map key. For each quantized embedding: a centroid seed is generated using a hash function (e.g., SHA256) and based on a first seed associated with a user (e.g., of the client device) and a centroid ID; an encrypted token is generated from constrained PRF and based on G0 and G1 as previously described; a salted centroid ID is generated using the same hash function and based on a second seed associated with the user and the centroid ID; hashT and hashF hash tokens and hash files are generated based on the salted centroid ID and encrypted token; and the hash token and hash file are send to the index database (e.g., database(s) 150, server(s) 120, and/or a device not shown in FIG. 1).

Figure 11:
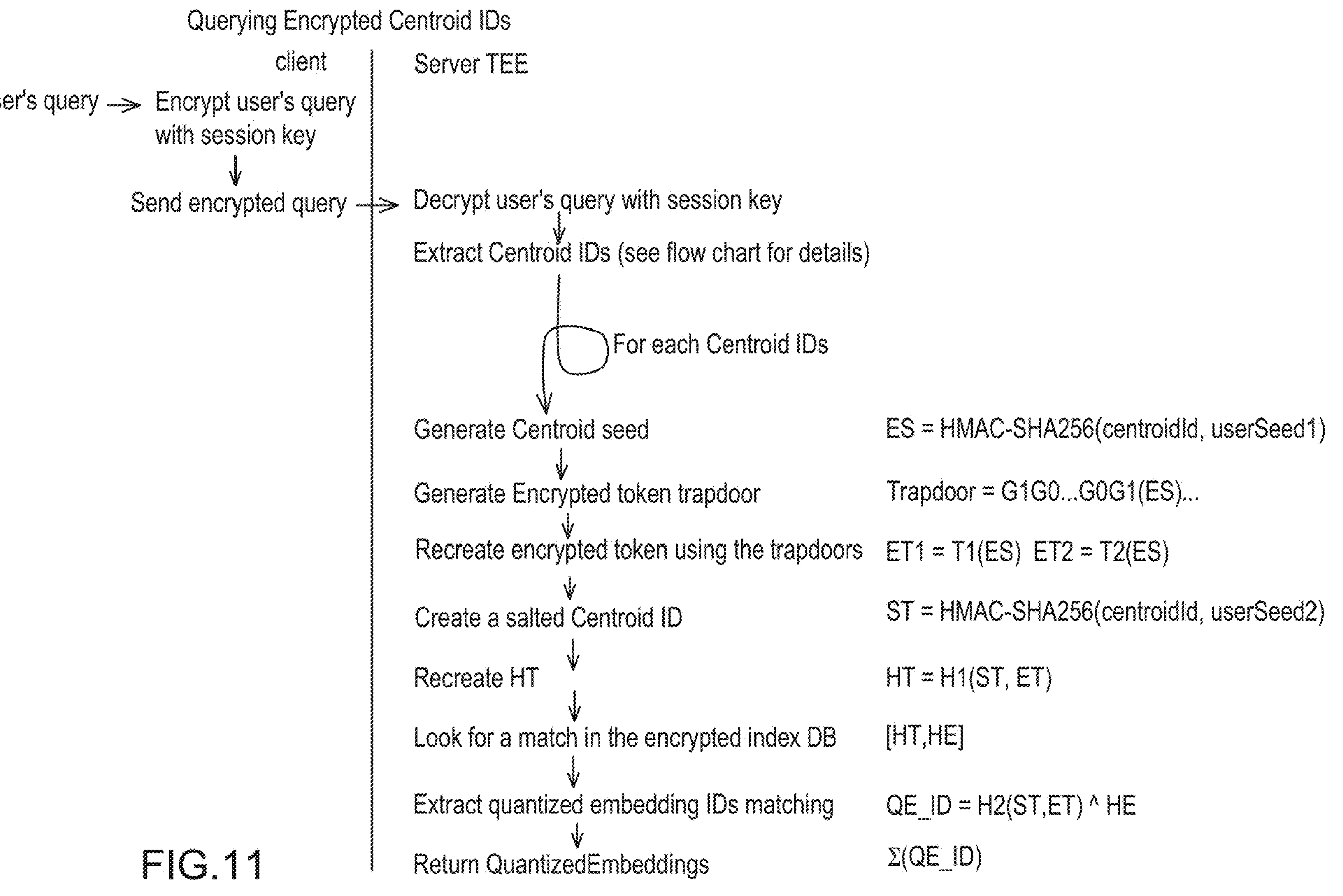
FIG. 11 illustrates querying encrypted centroid identifiers (IDs), according to an embodiment.

FIG. 11 illustrates querying encrypted centroid IDs, according to an embodiment. At a client device (e.g., client device(s) 110), a user's query is received and the user's query is encrypted with a session key. The encrypted query is then sent a server device (e.g., server(s) 120). At the server device, the user's query is decrypted using a session key and the centroid ID is extracted. For each centroid ID: a centroid seed is generated using a hash function (e.g., SHA256) and based on a first seed associated with a user (e.g., of the client device) and a centroid ID; an encrypted token trapdoor is generated based on G0 and G1 as previously discussed; the encrypted token is recreated using the trapdoor; a salted centroid ID is generated using the same hash function and based on a second seed associated with the user and the centroid ID; a hashT token (HT) is recreated using the slated centroid ID and encrypted token; a match for the hashT token is searched for in an encrypted index database; the quantized embedding ID(s) is extruded from a found match; and the quantized embedding is returned.

Figure 12:
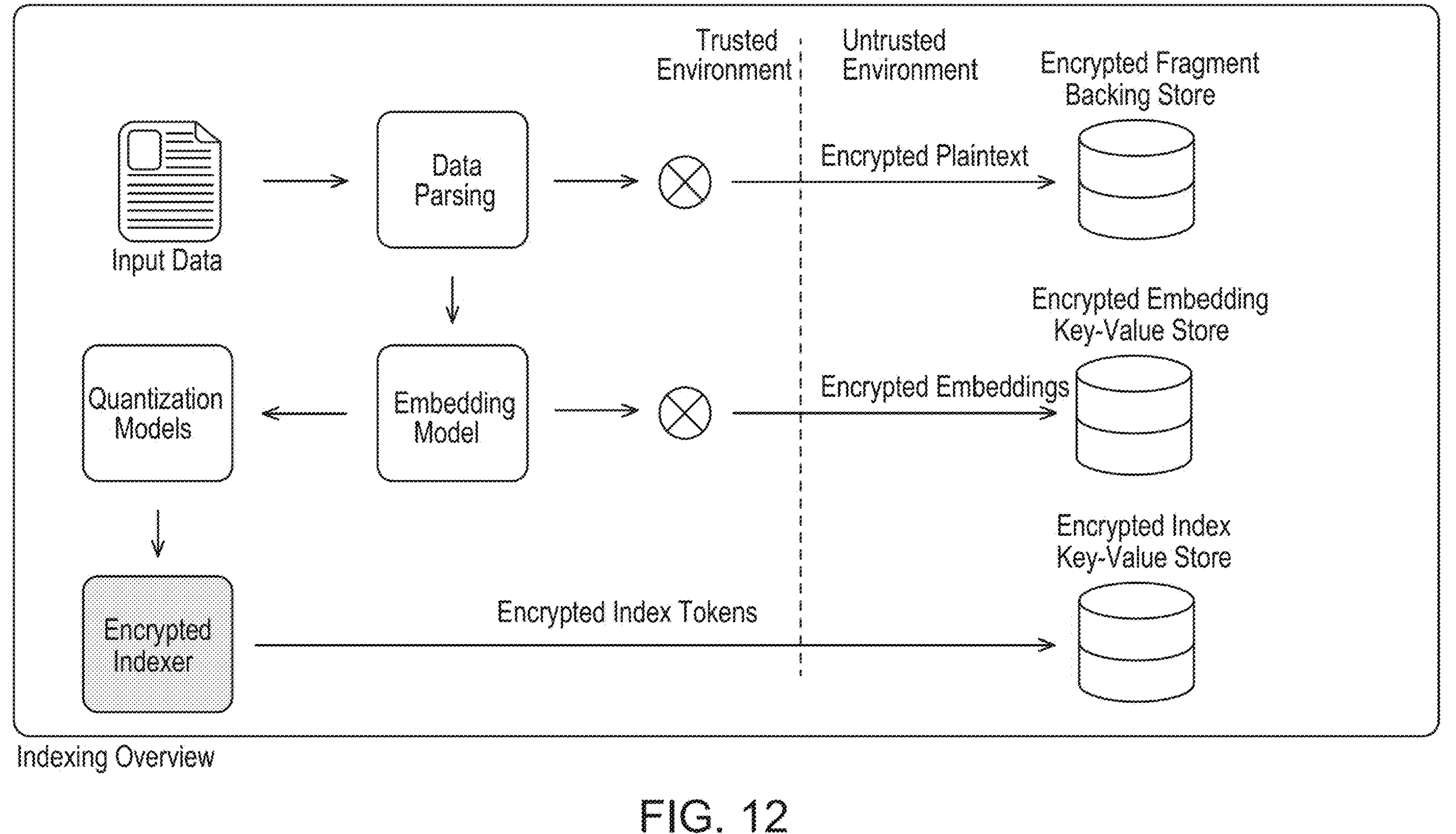
FIG. 12 illustrates an overview of indexing, according to an embodiment.

FIG. 12 illustrates an overview of indexing, according to an embodiment. In a trusted environment, input data is parsed and used to generate encrypted plaintext in an untrusted environment at an encrypted fragment backing store. The parsed data is also used (e.g., input) at an embedding model and used to store encrypted embeddings at an encrypted embedding key-value store Output from the embedding model is further used (e.g., input) at a quantization model(s); the output is used by an encrypted indexer to generate encrypted index token that are stored at an encrypted index key-value store.

Figure 13:
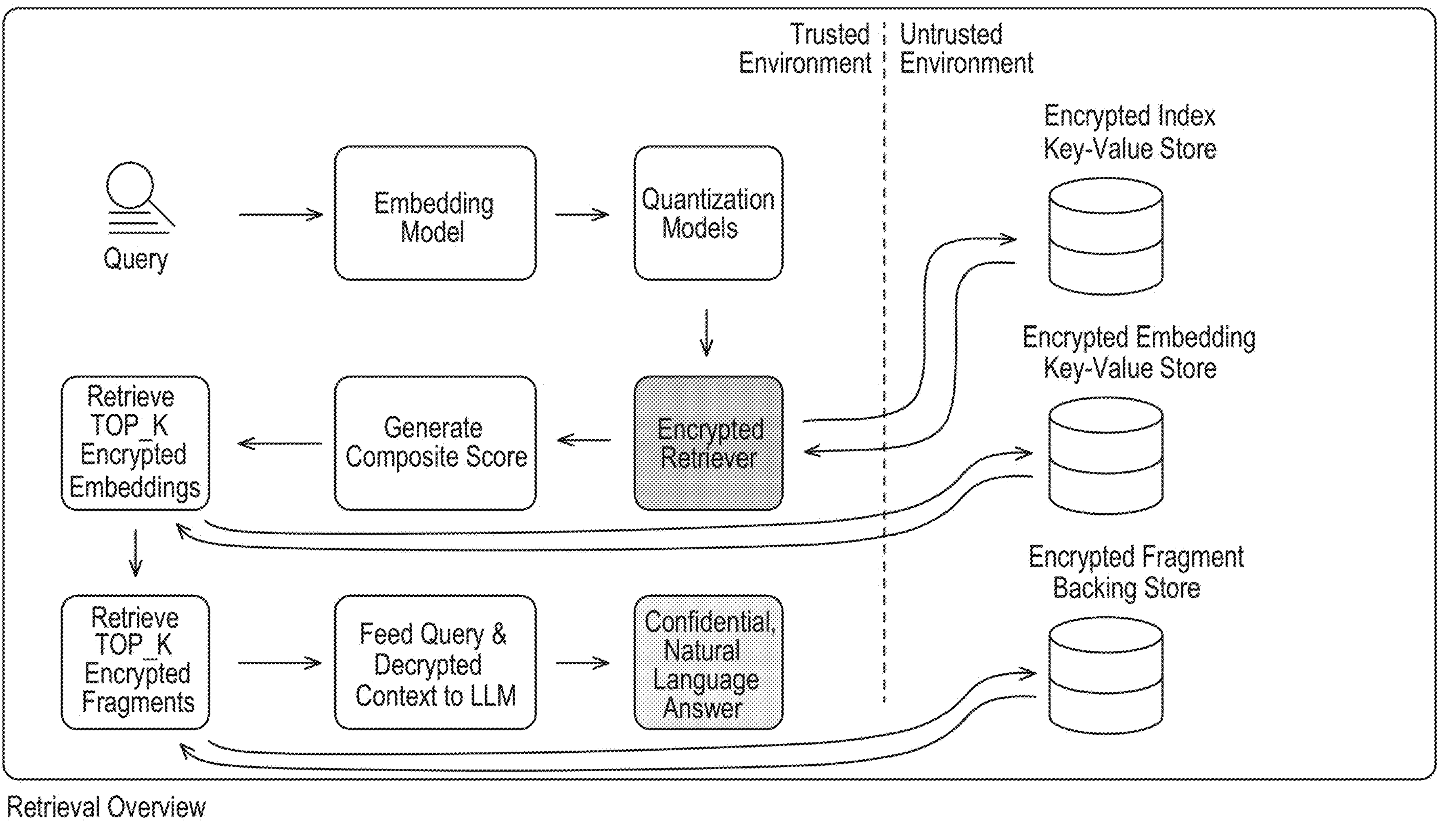
FIG. 13 illustrates an overview of retrieval, according to an embodiment.

FIG. 13 illustrates an overview of retrieval, according to an embodiment. In a trusted environment, a query is input to an embedding model, and output from the embedding model is input into a quantization model. Output from the quantization model is input, along with data from the encrypted index key-value store, to an encrypted retriever to generate a composite store that is (1) stored at the encrypted index key-value store and (2) used, along with data from the encrypted embedding key-value store, to retrieve the top K encrypted embeddings. A representation of the top K encrypted embeddings are stored at the encrypted embedding key-value store and used, along with data from the encrypted fragment backing store, to retrieve the top K encrypted fragments. The top K encrypted fragments are stored at the encrypted fragment backing store and subsequently query & decrypted context is fed to a large language model (LLM) that produces a representation of a confidential, natural language answer.

Figure 14:
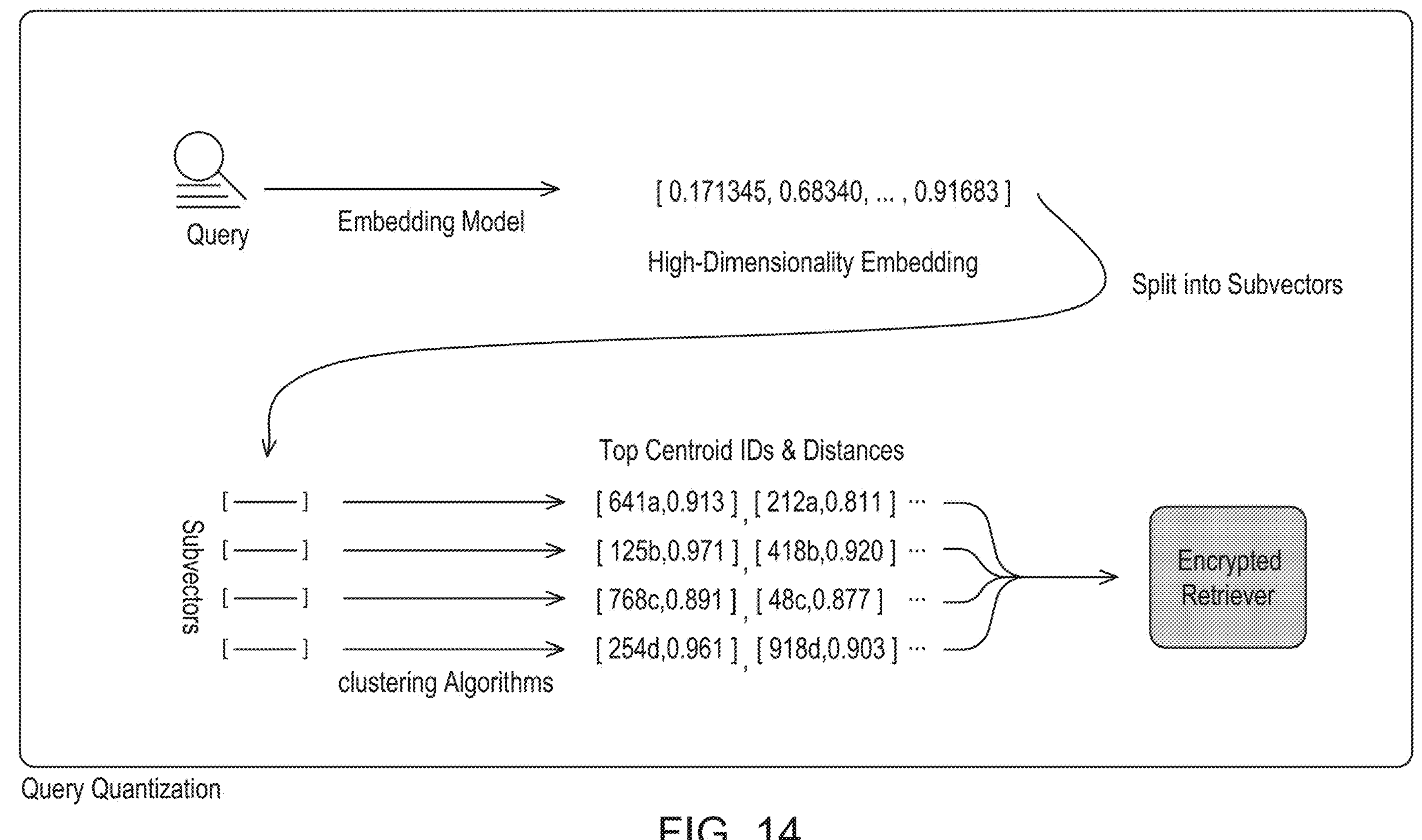
FIG. 14 illustrates query quantization, according to an embodiment.

FIG. 14 illustrates query quantization, according to an embodiment. A query is input to an embedding model to generate a high-dimensionality embedding. The high-dimensionality embedding is split into subvectors, and the top centroid IDs and distance are identified for each subvector based on a cluster algorithm for that centroid ID. Top centroid IDs and distances and then input to an encrypted retriever.

Figure 15:
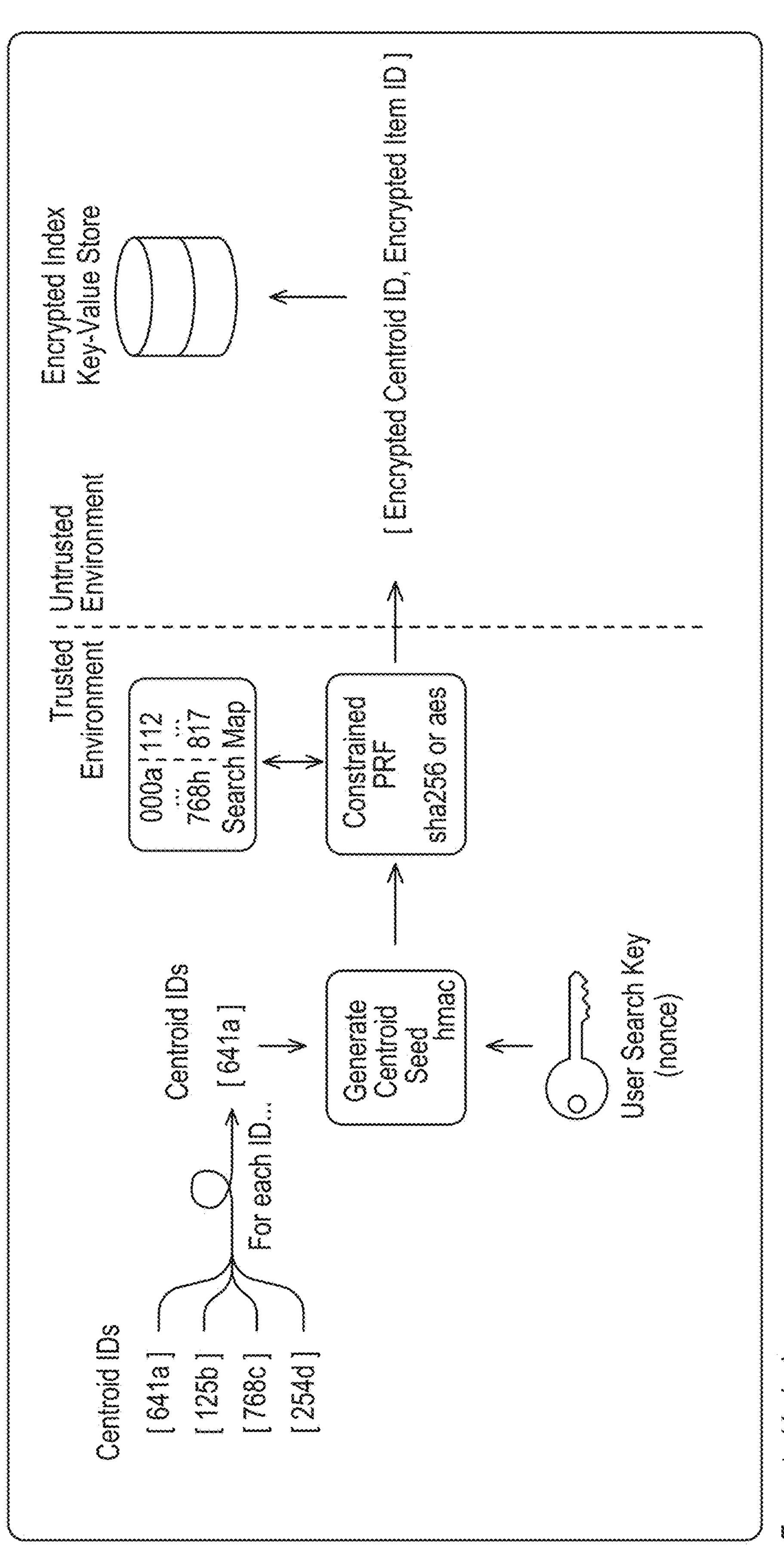
FIG. 15 illustrates encrypted indexing, according to an embodiment.

FIG. 15 illustrates encrypted indexing, according to an embodiment. For each centroid ID, a centroid seed is generated using a user search key (nonce). Constrained PRF is used, along with the centroid seed and search map to generate an encrypted centroid ID and encrypted item ID, each of which are stored in the encrypted index key-value store.

Figure 16:
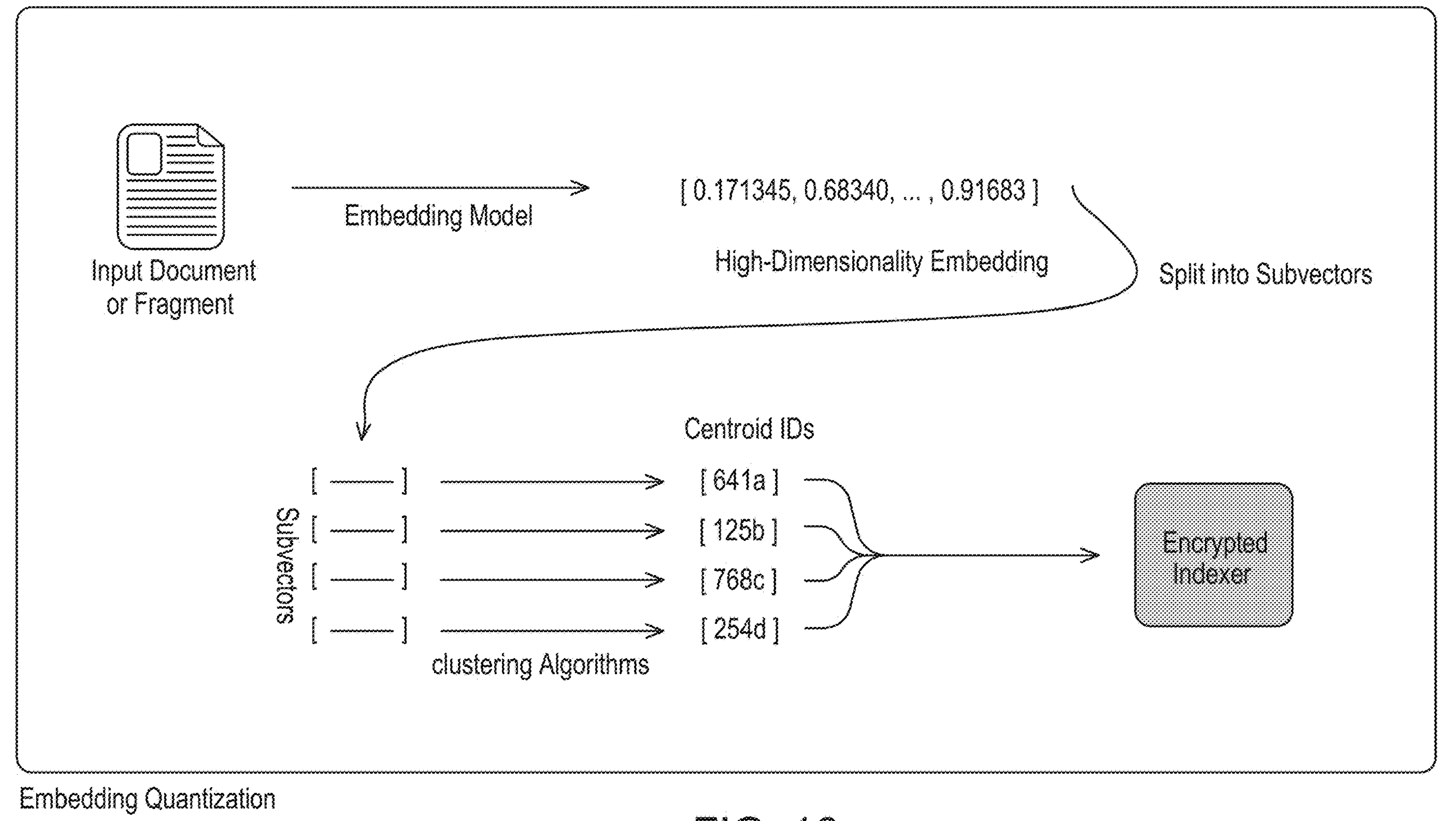
FIG. 16 illustrates embedding quantization, according to an embodiment.

FIG. 16 illustrates embedding quantization, according to an embodiment. An input document or fragment is input to an embedding model to generate a high-dimensionality embedding. The high-dimensionality embedding is split into subvectors, and centroid IDs are identified for each subvector based on a cluster algorithm for that centroid ID. The centroid IDs are then encrypted and indexed.

Figure 17:
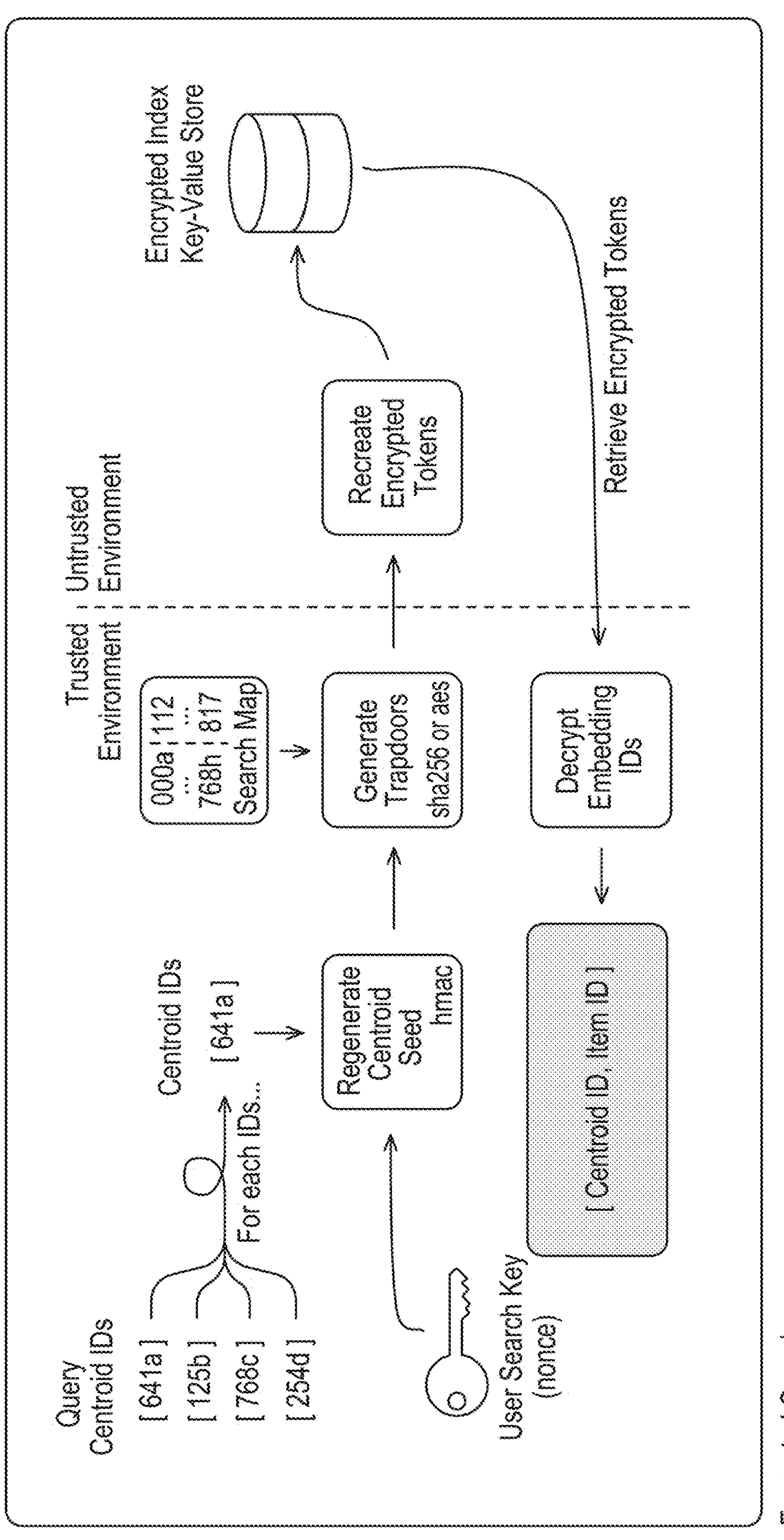
FIG. 17 illustrates encrypted querying, according to an embodiment.

FIG. 17 illustrates encrypted querying, according to an embodiment. In a trusted environment, centroid IDs are queried. For each centroid ID, a centroid seed is regenerated based on a user search key (nonce) and trapdoors are generated based on a search map. In an untrusted environment, encrypted tokens are recreated and stored at the encrypted index key-value store. Encrypted tokens are retrieved from the encrypted index key-value store and used to decrypt embedding IDs.

Figure 18:
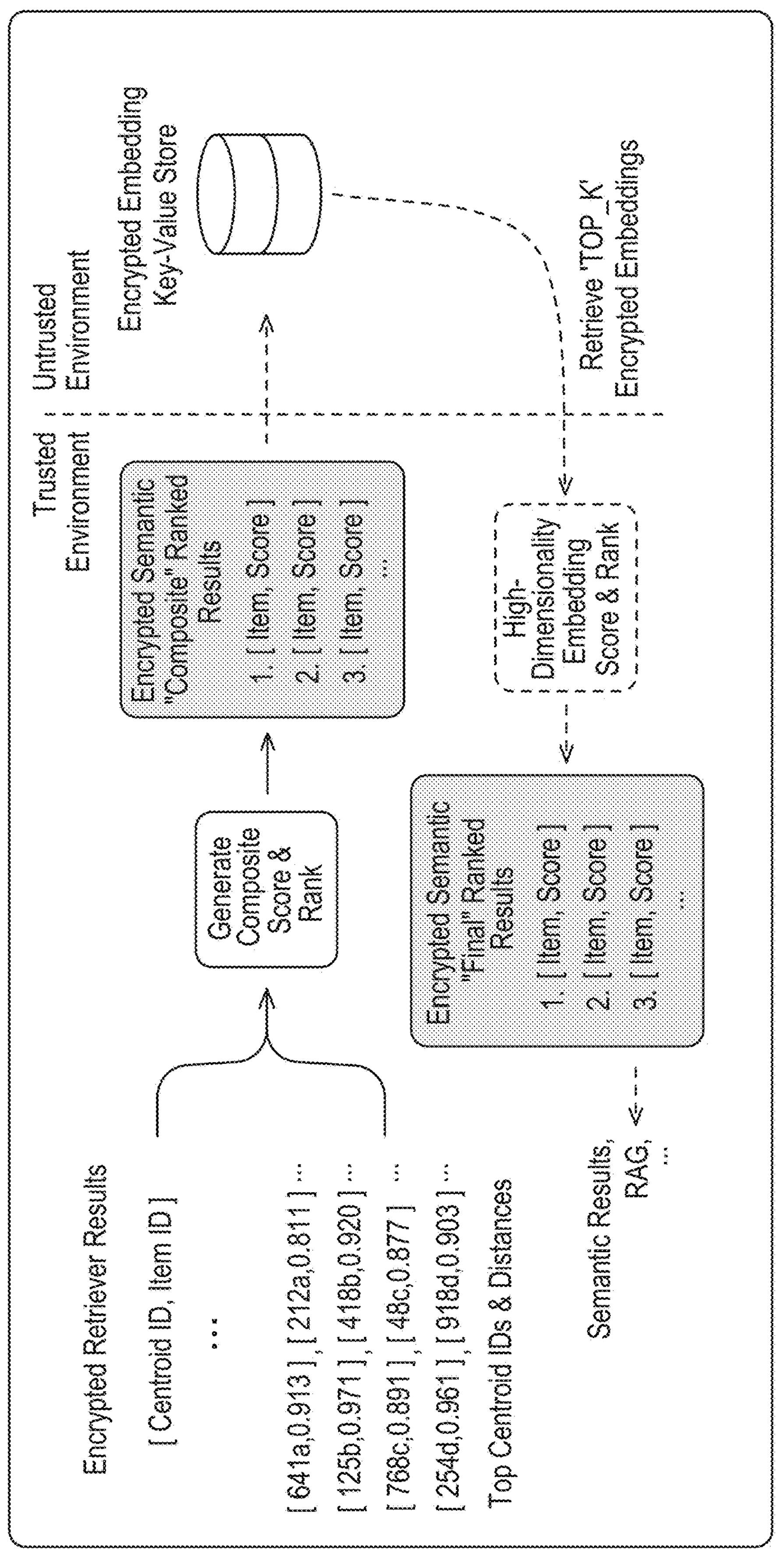
FIG. 18 illustrates scoring, ranking and Retrieval-Augmented Generation ("RAG"), according to an embodiment.

FIG. 18 illustrates scoring, ranking and RAG, according to an embodiment. The encrypted retriever results and top centroids IDs and distances are used to generate a composite score and rank in a trusted environment. The scores and ranks are stored at the encrypted embedding key-value store, and the top K encrypted embeddings are retrieved. The top K encrypted embeddings are using to generated high-dimensionality embedding score and rank, and generate a set of final ranked results.

In some embodiments, a non-transitory, processor-readable medium stores instructions to cause a processor to identify at least one index parameter from a plurality of index parameters, and to select an embedding model based on the at least one index parameter. The non-transitory, processor-readable medium also stores instructions to generate indexable data based on parsed data, and to generate a plurality of embeddings based on the indexable data, using the embedding model. Each embedding from the plurality of embeddings includes a vector representation of at least a portion of the indexable data. The non-transitory, processor-readable medium also stores instructions to quantize the plurality of embeddings based on the at least one index parameter and using at least one of the embedding model or a clustering model, to generate a set of centroid identifiers, and to index the set of centroid identifiers using an encryption technique, to generate a queryable, encrypted index.

In some implementations, the plurality of index parameters includes at least one of a plurality of vector embedding model types, a plurality of quantization parameters, or a plurality of index modes. The plurality of index modes can include at least one of: inverted file ("IVF"), product-quantized inverted file ("PQIVF"), or IVF with product quantization ("IVFPQ").

In some implementations, the indexable data includes plaintext. Alternatively or in addition, the indexable data includes preprocessed media. In some implementations, the parsed data includes text and the indexable data includes plaintext.

In some implementations, the parsed data does not include text, and the plurality of embeddings includes multi-modal embeddings that represent at least one of audio data, image data, video data, sensor data, biometric data, geospatial data, time series data, three-dimensional (3D) scan data, or graph data.

In some embodiments, a method includes identifying, via a processor, at least one index parameter from a plurality of index parameters, and training, via the processor, an embedding model based on the at least one index parameter, to produce a trained embedding model. The method also includes receiving data at the processor, and parsing the data via the processor to generate indexable data. The method also includes generating, via the processor, a plurality of embeddings based on the indexable data, using the trained embedding model. Each embedding from the plurality of embeddings includes a vector representation of at least a portion of the indexable data. The method also includes quantizing the plurality of embeddings, via the processor, based on the at least one index parameter and using the at least one of the trained embedding model or a clustering model, to generate a set of centroid identifiers. The method also includes indexing, via the processor, the set of centroid identifiers using an encryption technique, to generate a queryable, encrypted index.

The quantizing the plurality of embeddings can include performing a coarse quantization technique and/or a fine quantization technique.

In some embodiments, a system includes a processor and a memory, the memory being operably coupled to the processor and storing instructions that, when executed by the processor, cause the processor to generate at least one embedding based on a received query and using an embedding model. The at least one embedding can include a vector representation of the query. The memory also stores instructions to cause the processor to generate a first set of centroid identifiers by quantizing the at least one embedding, and for a given embedding from the at least one embedding: (1) identify a closest subset of centroid identifiers from a second set of centroid identifiers associated with indexed data, and (2) conduct an encrypted search based on the first set of centroid identifiers and the closest subset of centroid identifiers, to generate a query result for the received query. Note that in some implementations, rather than receiving a query and generating at least one embedding based on the received query, in other implementations the query may itself include an embedding and/or a centroid identifier, such that generation of an embedding(s) need not be performed.

In some implementations, the instructions to generate the first set of centroid identifiers include instructions to generate the first set of centroid identifiers by quantizing each subvector from a plurality of subvectors of the at least one embedding.

In some implementations, the instructions to generate the first set of centroid identifiers include instructions to generate the first set of centroid identifiers using at least one trained clustering model.

In some implementations, the instructions to generate the first set of centroid identifiers include instructions to generate the first set of centroid identifiers by directly quantizing the at least one embedding using a coarse quantization.

In some implementations, the encrypted search is performed using a hash vectorization model, which optionally includes a hash filter and a chain vector.

In some implementations, the instructions to conduct the encrypted search include instructions to rank each centroid identifier from the closest subset of centroid identifiers based on a distance between that centroid identifier and the given embedding from the at least one embedding.

In some implementations, the instructions to conduct the encrypted search include do not include instructions that result in the decryption of the indexed data or of the query.

In some implementations, the memory also stores instructions that, when executed by the processor, cause the processor to determine a query intent based on the received query.

In some implementations, the memory also stores instructions that, when executed by the processor, cause the processor to determine a query intent based on the received query, and the instructions to generate a query result include instructions to compute and merge fragment scores computed based on the encrypted search, when the query intent is semantic.

In some implementations, the memory also stores instructions that, when executed by the processor, cause the processor to determine a query intent based on the received query, and the instructions to generate a query result include instructions to send the query and context to a large language model (LLM), when the query intent is Retrieval Augmented Generation (RAG) and semantic.

In some embodiments, a non-transitory, processor-readable medium stores instructions to cause a processor to receive, at the processor and from a compute device, a query string, and to perform at least one of stemming or stop-word removal on the query string, to identify at least one unique keyword associated with the query string. The non-transitory, processor-readable medium also stores instructions to cause the processor to generate a keyword seed based on the at least one unique keyword and using a hash-based message authentication code (HMAC), and to generate a set of at least one private token based on the keyword seed, using a hash function and at least one private key. The non-transitory, processor-readable medium also stores instructions to cause the processor to hash each private token from the set of at least one private token to generate a plurality of encrypted salted keywords. The non-transitory, processor-readable medium also stores instructions to cause the processor to send a signal to a server to query the server using the plurality of encrypted salted keywords, at least one encrypted index token, and a keyword count associated with the query string, to identify an encrypted search result for the query string. The non-transitory, processor-readable medium also stores instructions to cause the processor to cause transmission of a signal representing the encrypted search result to the compute device for decryption and parsing.

In some implementations, the at least one private key includes at least one HMAC-SHA256 key, and optionally includes a first HMAC-SHA256 key and a second HMAC-SHA256 key.

In some implementations, the instructions to query the server to identify the encrypted search result include instructions to query a keyword map of the server.

In some implementations, the instructions to query the server to identify the encrypted search result include instructions to query the server without decrypting any encrypted data stored at the server.

In some implementations, the instructions to hash each private token from the set of at least one private token include instructions to hash each private token from the set of at least one private token using a first hash function and a second hash function different from the first hash function.

In some implementations, the instructions to perform at least one of stemming or stop-word removal on the query string include instructions to perform both stemming and stop-word removal on the query string.

In some implementations, the hash function is one of a one-way hash function or a trapdoor function.

In some implementations, at least one of (a) the at least one unique keyword, (b) the keyword seed, or (c) the plurality of encrypted salted keywords includes at least one of a centroid identifier or a lexical word.

All combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A non-transitory, processor-readable medium storing instructions to cause a processor to:

generate a plurality of embeddings based on indexable data and using an embedding model, each embedding from the plurality of embeddings including a vector representation of indexable data;

quantize the plurality of embeddings based on at least one index parameter and using at least one of the embedding model or a clustering model, to generate a set of centroid identifiers; and index the set of centroid identifiers using an encryption technique, to generate a queryable, encrypted index.

2. The non-transitory, processor-readable medium of claim 1, wherein the at least one index parameter includes at least one of a plurality of vector embedding model types, a plurality of quantization parameters, or a plurality of index modes.

3. The non-transitory, processor-readable medium of claim 2, wherein the plurality of index modes includes at least one of: inverted file ("IVF"), product-quantized inverted file ("PQIVF"), or IVF with product quantization ("IVFPQ").

4. The non-transitory, processor-readable medium of claim 1, wherein the indexable data includes one of plaintext or preprocessed media.

5. A method, comprising:

generating, via a processor, a plurality of embeddings based on indexable data and using an embedding model, each embedding from the plurality of embeddings including a vector representation of the indexable data;

quantizing the plurality of embeddings, via the processor, based on at least one index parameter and using at least one of the embedding model or a clustering model, to generate a set of centroid identifiers; and indexing, via the processor, the set of centroid identifiers using an encryption technique, to generate a queryable, encrypted index.

6. The method of claim 5, wherein the quantizing the plurality of embeddings includes performing coarse quantization.

7. The method of claim 5, wherein the quantizing the plurality of embeddings is performed using a fine quantization technique.

8. A system, comprising:

a processor; and a memory, operably coupled to the processor and storing instructions that, when executed by the processor, cause the processor to:

generate a first set of centroid identifiers based on at least one embedding generated using an embedding model and including a vector representation of a query;

for a given embedding from the at least one embedding:

identify a subset of centroid identifiers from a second set of centroid identifiers associated with indexed data, and conduct an encrypted search based on the first set of centroid identifiers and the subset of centroid identifiers, to generate a query result for the query.

9. The system of claim 8, wherein the instructions to generate the first set of centroid identifiers include instructions to generate the first set of centroid identifiers by quantizing each subvector from a plurality of subvectors of the at least one embedding.

10. The system of claim 8, wherein the instructions to generate the first set of centroid identifiers include instructions to generate the first set of centroid identifiers using at least one trained clustering model.

11. The system of claim 8, wherein the instructions to generate the first set of centroid identifiers include instructions to generate the first set of centroid identifiers by directly quantizing the at least one embedding using a coarse quantization.

12. The system of claim 8, wherein the encrypted search is performed using a hash vectorization model.

13. The system of claim 8, wherein the instructions to conduct the encrypted search include instructions to rank each centroid identifier from the subset of centroid identifiers based on a distance between that centroid identifier and the given embedding from the at least one embedding.

14. The system of claim 8, wherein the instructions to conduct the encrypted search include do not include instructions that result in the decryption of the indexed data or of the query.

15. The system of claim 8, wherein the memory further stores instructions that, when executed by the processor, cause the processor to determine a query intent based on the query.

16. The system of claim 8, wherein the memory further stores instructions that, when executed by the processor, cause the processor to determine a query intent based on the query, and the instructions to generate a query result include instructions to compute and merge fragment scores computed based on the encrypted search, when the query intent is semantic.

17. The system of claim 8, wherein the memory further stores instructions that, when executed by the processor, cause the processor to determine a query intent based on the query, and the instructions to generate a query result include instructions to send the query and context to a large language model (LLM), when the query intent is Retrieval Augmented Generation (RAG) and semantic.

18. A non-transitory, processor-readable medium storing instructions to cause a processor to:

perform at least one of stemming or stop-word removal on a query string, to identify at least one unique keyword associated with the query string;

generate a set of at least one private token based on the at least one unique keyword, using a hash function and at least one private key;

hash each private token from the set of at least one private token to generate a plurality of encrypted salted keywords;

send a signal to a server to query the server using at least one of (1) the plurality of encrypted salted keywords, (2) at least one encrypted index token, or (3) a keyword count associated with the query string, to identify an encrypted search result for the query string; and cause transmission of a signal representing the encrypted search result to a compute device associated with the query string, for decryption and parsing.

19. The non-transitory, processor-readable medium of claim 18, wherein the at least one private key includes at least one HMAC-SHA256 key.

20. The non-transitory, processor-readable medium of claim 18, wherein the instructions to query the server to identify the encrypted search result include instructions to query a keyword map of the server.

21. The non-transitory, processor-readable medium of claim 18, wherein the instructions to query the server to identify the encrypted search result include instructions to query the server without decrypting any encrypted data stored at the server.

22. The non-transitory, processor-readable medium of claim 18, wherein the instructions to hash each private token from the set of at least one private token include instructions to hash each private token from the set of at least one private token using a first hash function and a second hash function different from the first hash function.

23. The non-transitory, processor-readable medium of claim 18, wherein the hash function is one of a one-way hash function or a trapdoor function.

24. The non-transitory, processor-readable medium of claim 18, wherein at least one of the at least one unique keyword or the plurality of encrypted salted keywords includes at least one of a centroid identifier or a lexical word.

* * * * *